United States Patent
Glassman et al.

(10) Patent No.: US 8,214,272 B2
(45) Date of Patent: Jul. 3, 2012

(54) WEB SITE VALUATION

(75) Inventors: Brian Scott Glassman, Pembroke Pines, FL (US); Rafael A. Sosa Arvelo, San Juan, PR (US)

(73) Assignee: Rafael A. Sosa, Caguas, PR (US)

( * ) Notice: Subject to any disclaimer, the term of this patent is extended or adjusted under 35 U.S.C. 154(b) by 1039 days.

(21) Appl. No.: 11/470,109

(22) Filed: Sep. 5, 2006

(65) Prior Publication Data

US 2008/0059348 A1    Mar. 6, 2008

(51) Int. Cl.
  *G06Q 40/00* (2012.01)
  *G06Q 30/00* (2012.01)
  *G06F 15/173* (2006.01)
  *G06F 15/16* (2006.01)
  *G06F 17/18* (2006.01)
  *G06F 19/00* (2011.01)
  *G07G 1/00* (2006.01)
  *G07G 1/12* (2006.01)

(52) U.S. Cl. ......... 705/35; 705/26.1; 709/223; 709/224; 702/179; 370/229

(58) Field of Classification Search .............. 705/35, 705/26.1; 709/223, 224; 702/179; 370/229
See application file for complete search history.

(56) References Cited

U.S. PATENT DOCUMENTS

| | | | | |
|---|---|---|---|---|
| 6,078,866 A | * | 6/2000 | Buck et al. | ........................ 702/2 |
| 6,330,547 B1 | | 12/2001 | Martin | |
| 6,381,635 B1 | * | 4/2002 | Hoyer et al. | ................. 709/207 |
| 6,907,566 B1 | | 6/2005 | McElfresh et al. | |
| 2002/0002523 A1 | | 1/2002 | Kossovsky et al. | |
| 2002/0002524 A1 | | 1/2002 | Kossovsky et al. | |
| 2002/0007336 A1 | | 1/2002 | Robbins | |
| 2002/0046038 A1 | | 4/2002 | Prokoski | |
| 2002/0069378 A1 | * | 6/2002 | McLellan et al. | ............... 714/43 |
| 2002/0077942 A1 | | 6/2002 | Wilkinson | |
| 2002/0078045 A1 | * | 6/2002 | Dutta | ................................ 707/7 |
| 2002/0087448 A1 | | 7/2002 | Wilkinson | |
| 2002/0087679 A1 | * | 7/2002 | Pulley et al. | .................. 709/224 |

(Continued)

FOREIGN PATENT DOCUMENTS

WO    WO 00/16218 A1    3/2000

(Continued)

OTHER PUBLICATIONS

Home page usability and credibility; William Brown, Mezbahur Rahman, Travis Hacker; Information Management & Computer Security; 2006. vol. 14, Iss. 3; 19-pages.*

(Continued)

*Primary Examiner* — Gregory Johnson
(74) *Attorney, Agent, or Firm* — Lee & Hayes, PLLC

(57) ABSTRACT

According to the invention, a method for automatically determining an appraisal value of a web site is disclosed. The method may include obtaining machine observable information from the web site and determining a machine observable characteristic of the web site based at least in part on the machine observable information from the web site. The method may also include storing at least one of the machine observable information from the web site, and the machine observable characteristic of the web site. The method may further include determining the appraisal value of the web site based at least in part on at least one of the machine observable information from the web site, and the machine observable characteristic of the web site.

24 Claims, 8 Drawing Sheets

U.S. PATENT DOCUMENTS

| | | | |
|---|---|---|---|
| 2002/0099637 A1 | 7/2002 | Wilkinson et al. | |
| 2002/0128985 A1 | 9/2002 | Greenwald | |
| 2002/0133436 A1 | 9/2002 | Hermreck et al. | |
| 2002/0147895 A1* | 10/2002 | Glance et al. | 711/158 |
| 2003/0004936 A1 | 1/2003 | Grune et al. | |
| 2003/0033237 A1 | 2/2003 | Bawri | |
| 2003/0036964 A1 | 2/2003 | Boyden et al. | |
| 2003/0061118 A1 | 3/2003 | Kocher | |
| 2003/0061150 A1 | 3/2003 | Kocher | |
| 2003/0097282 A1 | 5/2003 | Guse et al. | |
| 2003/0130982 A1* | 7/2003 | Kasriel et al. | 707/1 |
| 2003/0182166 A1 | 9/2003 | Silver | |
| 2003/0182365 A1* | 9/2003 | Toda et al. | 709/203 |
| 2003/0187719 A1* | 10/2003 | Brocklebank | 705/10 |
| 2003/0208494 A1 | 11/2003 | Francois Olivier | |
| 2004/0019677 A1* | 1/2004 | Fukumoto et al. | 709/224 |
| 2004/0139192 A1* | 7/2004 | Spaid | 709/224 |
| 2004/0158536 A1 | 8/2004 | Kowal et al. | |
| 2004/0176992 A1* | 9/2004 | Santos et al. | 705/10 |
| 2004/0190448 A1* | 9/2004 | Fishteyn et al. | 370/229 |
| 2004/0220842 A1* | 11/2004 | Barney | 705/7 |
| 2004/0220872 A1 | 11/2004 | Pollock, III | |
| 2004/0267657 A1 | 12/2004 | Hecht | |
| 2005/0021434 A1 | 1/2005 | D'Loren | |
| 2005/0065870 A1 | 3/2005 | Yu | |
| 2005/0097088 A1* | 5/2005 | Bennett et al. | 707/3 |
| 2005/0114510 A1 | 5/2005 | Error et al. | |
| 2005/0203833 A1 | 9/2005 | Pembroke | |
| 2005/0203917 A1 | 9/2005 | Freeberg et al. | |
| 2005/0234733 A1 | 10/2005 | Leitner | |
| 2005/0256951 A1* | 11/2005 | Shapira et al. | 709/223 |
| 2005/0262240 A1* | 11/2005 | Drees et al. | 709/224 |
| 2005/0278246 A1 | 12/2005 | Friedman et al. | |
| 2005/0289468 A1 | 12/2005 | Kahn et al. | |
| 2006/0004784 A1* | 1/2006 | Ableman et al. | 707/100 |
| 2006/0069663 A1* | 3/2006 | Adar et al. | 707/1 |
| 2006/0212459 A1* | 9/2006 | Sugimura | 707/100 |
| 2006/0253345 A1* | 11/2006 | Heber | 705/27 |
| 2006/0253458 A1* | 11/2006 | Dixon et al. | 707/10 |
| 2007/0005417 A1* | 1/2007 | Desikan et al. | 705/14 |
| 2007/0055477 A1* | 3/2007 | Chickering et al. | 702/182 |
| 2007/0106641 A1* | 5/2007 | Chi et al. | 707/3 |
| 2007/0192190 A1* | 8/2007 | Granville | 705/14 |
| 2007/0239701 A1* | 10/2007 | Blackman et al. | 707/5 |
| 2008/0059301 A1* | 3/2008 | Granville | 705/14 |

FOREIGN PATENT DOCUMENTS

| | | |
|---|---|---|
| WO | WO 01/01621 A2 | 1/2001 |
| WO | WO 02/42980 A1 | 5/2002 |

OTHER PUBLICATIONS

Web-Site Analytics—A Land Mine or a Gold Mine?; Jerry J. Hosking; SAS Institute Inc.; Feb. 2006; 19-pages.*

The Big Book of Key Performance Indicators; Eric T. Peterson; Jan. 1, 2006; 109-pages.*

* cited by examiner

WEB SITE VALUATION

RELATED DISCLOSURE

This non-provisional patent application relates to subject matter disclosed in Disclosure Document Number 590385, entitled "Website Valuation & AMIS" received by the United State Patent and Trademark Office on Nov. 21, 2005.

BACKGROUND OF THE INVENTION

The history of valuations is extensive and dates back to the early times of recorded history. For many centuries, people have been evaluating and appraising the monetary value of non-commodity items like, land, real-estate, jewelry, precious minerals, art, antiques, insurance and even businesses. From the beginning of written history until about 1500 A.D., appraisals were in demand for trade purposes and by governments, which required the appraisals to levy proper taxes.

In the early 1500's, methods of determining the value of real property were used to determine the value of land rented out by churches or nobility. In the mid 1700's the practice of valuation expanded dramatically, primarily due to expanded land ownership by private individuals and businesses. In the mid 1800's, at the ascendancy of the industrial age, a professional class of appraisers was created to support burgeoning economies. During the mid 1900's new property like industrial equipment, construction equipment, transportation vehicles, infrastructure, and financial debt started to be appraised in mass. Many specialized businesses sprouted up around the task of valuation. In 1834 A.D. the Royal Institution of Chartered Surveyors, one of the first professional appraisal organizations, was created in London to focus on land and real-estate appraisal and valuation. In the later part of the 1800's, new financial instruments like stock, options, futures, and bonds started to be appraised and traded based on such valuations. Furthermore, new intangible items like copyrights, trademarks, and patents also started to be appraised for value.

Today, almost any tangible or intangible item which may be bought, sold, or traded, may be appraised manually by a trained individual. While the digital age of computers and the Internet have allowed many types of appraisals to become automated, computers and the Internet have also introduced new types of intangible property such as web sites, domain names, virtual advertising space, web traffic, user-created content, and syndicated information feeds. The values of some of these new types of property may depend on many factors making manual gathering of information, appraisal, and valuation a complicated an expensive procedure. Accurate automated information gathering and appraisal of these intangible properties, as of yet, been unavailable.

The inability to automatically and accurately appraise web sites has created a broad lack of understanding of web site value in the market for buying and selling web sites. This has, in turn, led to limited market participation because of the high costs associated with available manual appraisal methods. Additionally, the inability to efficiently and accurately appraise and value web sites has led to the development and maintenance of web sites with less value to web users, financers and online advertisers.

BRIEF DESCRIPTION OF THE INVENTION

In one embodiment, a method for arranging or filtering a plurality of web sites based at least in part on an appraisal value of each web site is provided. The method may include obtaining machine observable information from each of a plurality of web sites. The plurality of web sites may include a first web site and a second web site. The method may also include determining a machine observable characteristic of the first web site based at least in part on the information from the first web site, and determining a machine observable characteristic of the second web site based at least in part on the information from the second web site. The method may further include storing at least one of the machine observable information from the first web site, and the machine observable characteristic of the first web site. The method may also include storing at least one of the machine observable information from the second web site, and the machine observable characteristic of the second web site. The method may determine an appraisal value of the first web site based at least in part on at least one of the machine observable information from the first web site, and the machine observable characteristic of the first web site. The method may also determine an appraisal value of the second web site based at least in part on at least one of the machine observable information from the second web site, and the machine observable characteristic of the second web site. The method may further arrange or filter the plurality of web sites based at least in part on the appraisal value of each web site.

In another embodiment, a method for automatically determining an appraisal value of a web site is provided. The method may include obtaining machine observable information from a web site and determining a machine observable characteristic of the web site based at least in part on the machine observable information from the web site. The method may also include storing at least one of the machine observable information from the web site, and the machine observable characteristic of the web site. The method may further include determining the appraisal value of the web site based at least in part on at least one of the machine observable information from the web site, and the machine observable characteristic of the web site.

In another embodiment, a machine-readable medium having machine-executable instructions for automatically determining an appraisal value of a web site is provided. The machine-readable medium may include machine-executable instructions for obtaining machine observable information from a web site. The machine-readable medium may also include machine-executable instructions for determining a machine observable characteristic of the web site based at least in part on the machine observable information from the web site. The machine-readable medium may further include storing at least one of the machine observable information from the web site, and the machine observable characteristic of the web site. The machine-readable medium may also include determining the appraisal value of the web site based at least in part on at least one of the machine observable information from the web site, and the machine observable characteristic of the web site.

In another embodiment, a method for automatically determining an appraisal value of a portion of a web site is provided. The method may include obtaining machine observable information from a portion of a web site, where the portion of the web site is selected from a group consisting of a domain name, an Internet forum, text content, a web page and a web feed. The method may also include determining a machine observable characteristic of the portion of the web site based at least in part on the machine observable information from the portion of the web site. The method may further include storing at least one of the machine observable information from the portion of the web site, and the machine observable characteristic of the portion of the web site. The method may also include determining the appraisal value of the portion of the web site based at least in part on at least one of the machine observable information from the portion of the web site, and the machine observable characteristic of the portion of the web site.

In another embodiment, a method for automatically determining an appraisal value of a domain name is provided. The method may include determining a machine observable characteristic of a domain name, and storing at least one of the domain name, and the machine observable characteristic of the domain name. The method may also include determining the appraisal value of the domain name based at least in part on the machine observable characteristic of the domain name.

BRIEF DESCRIPTION OF THE DRAWINGS

The present invention is described in conjunction with the appended figures.

Figure 1:
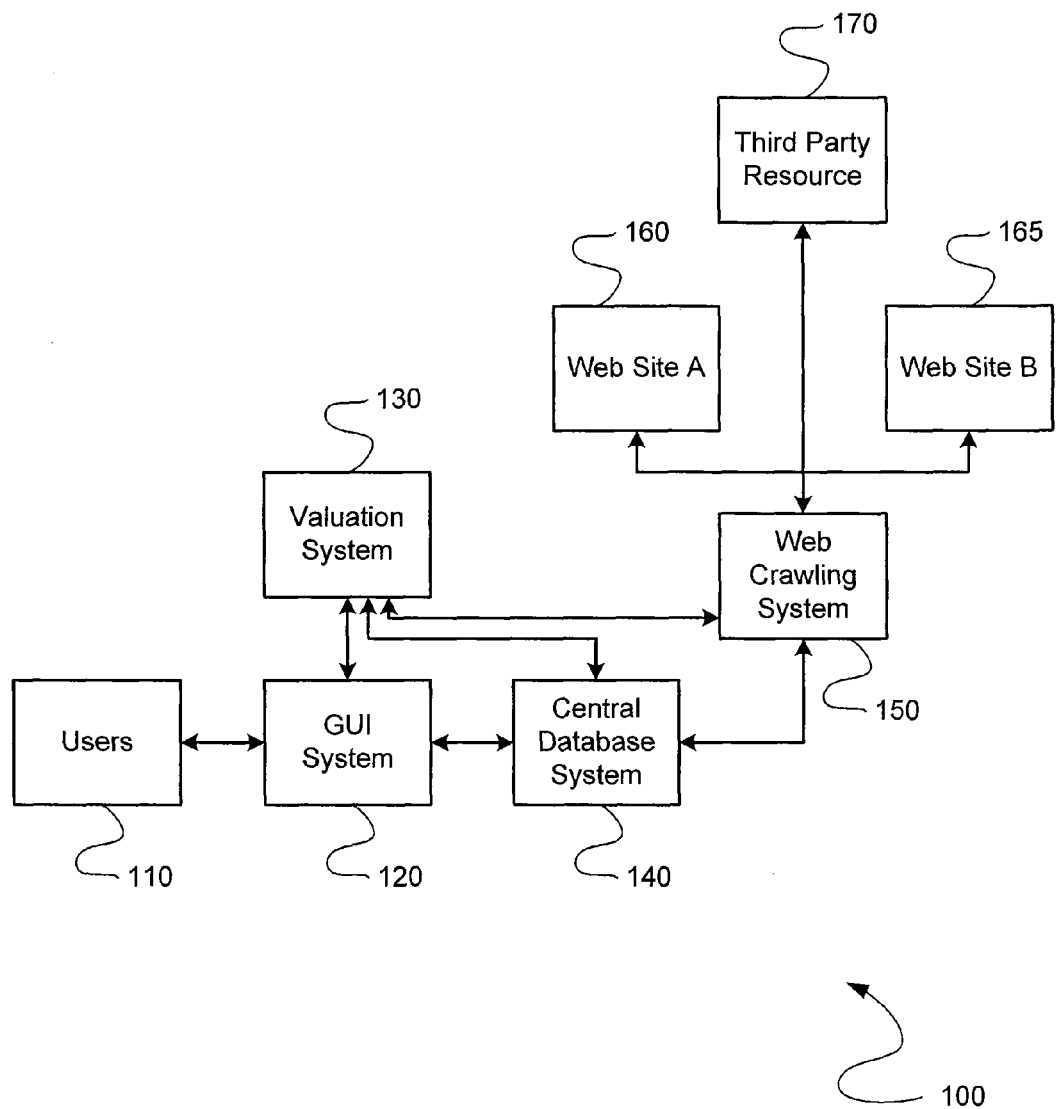
FIG. 1 is a block diagram of an embodiment of the invention for valuing a web site which includes a graphical user interface, a valuation system, a central database system and a web crawling system.

In the appended figures, similar components and/or features may have the same numerical reference label. Furthermore, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In one embodiment, a method for arranging or filtering a plurality of web sites based at least in part on an appraisal value of each web site is provided. Arranging a plurality of web sites may include, merely by way of example, categorizing web sites. The method may include obtaining machine observable information from each of a plurality of web sites. The plurality of web sites may include a first web site and a second web site. The method may also include determining a machine observable characteristic of the first web site based at least in part on the information from the first web site, and determining a machine observable characteristic of the second web site based at least in part on the information from the second web site.

The method may further include storing at least one of the machine observable information from the first web site, and the machine observable characteristic of the first web site. The method may also include storing at least one of the machine observable information from the second web site, and the machine observable characteristic of the second web site.

The method may determine an appraisal value of the first web site based at least in part on at least one of the machine observable information from the first web site, and the machine observable characteristic of the first web site. The method may also determine an appraisal value of the second web site based at least in part on at least one of the machine observable information from the second web site, and the machine observable characteristic of the second web site. In some embodiments, the method may also obtain machine observable information from a third-party source and determine the appraisal value of the first web site or the second web site based also at least in part on the machine observable information from the third-party source. The appraisal value may be a monetary amount, in any one or more types of currency. The method may further arrange or filter the plurality of web sites based at least in part on the appraisal value of each web site.

The machine observable information and characteristics from a web site may include various elements including operational elements, a domain name and/or sub domain name elements, content elements, web traffic elements, web feeds, marketing elements, third party elements, a classification of the web site, business elements and/or other miscellaneous elements. Though machine observable information may often be gathered or obtained from a source, and machine observable characteristics often determined based at least in part from this gathered information, in some embodiments, characteristics may also be gathered and obtained, similar to information. Merely by way of example, some third-party sources may have data which may be gathered and be properly referred to as both information and characteristics. In this example, the data may be information retrieved from the third-party source, but possibly be a characteristic of another web site or source.

Operational elements may possibly include any elements related to the operation, processes, and/or functionality of the web site and any of its other elements. These elements may, merely by way of example, be programming code, hosting details, server details, software client details, and/or web applications.

Examples of programming code information may include, merely by way of example, the programming code itself, the date of the code's creation, standard compliance of code, number of times the code was modified, and/or who the code was written by.

Examples of programming code characteristics may include, merely by way of example, the type, amount, quality, and/or attributes of the program code. Program code characteristics may also, merely by way of example, include the type of programming language, amount of programming code, the number of coded elements and subroutines, quality of code, and/or reputation of the programmer. Other examples of program code characteristics may also include the amount, proportion and ratios of: redundant code; non-operational code; code with programmer notes; code with buggy or miss-functional subroutines; malicious code; and/or code that may be a virus, Trojan, adware, and/or spyware.

Examples of hosting and server information may, merely by way of example, include the details of: the hosting account; the hosting company; the server account; and/or the servers. Hosting information may also, merely by way of example, include the number, type and attributes of the hosting and/or hosting company; and/or the number, type, and attributes of the servers and/or server company. Other examples of hosting and server information may also include leasing contract length; cost of contract; download and upload bandwidth; server disk space; number of allowed and/or supported domain names; and additional hosting and/or server account attributes.

In some cases the hosting company or a server company may not release some or all of the hosting and server information and characteristics about a website. In these cases a series of methods may be used to determine the hosting and server characteristics, which may overlap with some of the hosting and server information described.

Examples of types of server and hosting characteristics may, merely by way of example, include the number, proportion, and/or ratio of servers which are: dedicated; shared; rented; owned by a website; and the amount and frequency of the server's downtime, lag time, response time, download and upload bandwidth; the hosting server's reliability, reputation and third party rating of the hosting and server company.

Examples of software client information and characteristics may, merely by way of example, include the information and characteristics of: an email client, a news client, and/or an upload and/or download client. Further examples of web applications information and characteristics may, merely by way of example, include simple elements like calendars to more complex elements like application program Interfaces (API), API data streams, web based retail sales systems, and may include the cost, revenues, reputation, and attributes of those elements.

A domain name may be a series of alphanumeric strings separated by periods, such as "www.hmco.com" or "dog.com" that may be an address of a computer network connection. Sub-Domain names may be a type and variation of a domain name, for example "maps.google.com" may be a sub-domain name of "www.google.com". A domain name may provide a memorable or notable means of repeatedly accessing a specific web site or group of web sites.

The domain name or sub domain name elements may be separated into two categories: inherent features and external features. In some embodiments, inherent features may be fixed at the name's creation, and external features may be dynamic over time.

Inherent features may include both domain name information and domain name characteristics. Inherent domain name information may, merely by way of example, be the domain name itself, its DNS roots ending (for example, ".com" or ".org"), the date it was registered, date it expires, registrant, administrative and technical contact information, and/or the name server.

Inherent domain name characteristics may, merely by way of example, include the number, type, proportion, ratio and attractiveness of the: text characters; real words in the domain name; fictitious words in the domain; the words themselves; language of the words in the domain name; grammar (for example, plurality and sentence structure); punctuation marks and/or hyphens; Unicode symbols; similar looking words (for example, in www.pooltools.com); rhyming words (for example, in www.happypuppy.com). The combination of all of the above characteristics may contribute to how memorable a domain name is, and an attractiveness rating of the domain name.

External domain name features may take into account the environment's interaction with the domain name and include both domain name information and domain name characteristics. External domain name characteristics may, merely by way of example, include the number, type, quality, ratio, and proportion of the domain name's: keyword saturation (the number of search results for that domain name on a search engine); highly ranked keywords, keywords, back links; third party ranking of back links; online directory listing (like DMOZ); search result ranking; search results; and search engine linking to that domain name. Further examples of external domain name characteristic may include similar or confusing domain names, trademarked domain name, trademarks on similar or confusing domain names, and trademarked names of other organizations, registration date for a director directory, and/or length of registration directory. Other domain name characteristics may, merely by way of example, include the past, current and predicted amount and quality of the: web-traffic; visitors traffic; traffic from search engines; traffic from third party web site; traffic from affiliates; and/or direct traffic. For example, domain name information and characteristics may include share of heart (how well one identify with that name); share of mind (how quickly that name is recalled); attractiveness; how memorable the name is; the familiarity with the name; name association; and individual's or group's opinions of the name.

Content elements may, merely by way of example, include: web page content; digital media content; Internet forum content; and/or text content.

Web page content may include any information and/or characteristics related to content on a web page. Web page content information may, merely by way of example, include: a user interface; a graphical user interface, meta data; cascading style sheet; page layout; page details; links; advertisement placement; and/or graphically coded elements on the webpage.

Web page content characteristics may, merely by way of example, include the number, amount, proportion, type, quality and structure of the: graphical user interface; meta data; cascading style sheets; page layout; links; advertisement placement; external directed links; internally directed links; targets for links; and/or graphically coded elements on the webpage. Other web page content characteristics may include the webpage's display resolutions, compatible web browsers, number and quality of the dead links, number and ratio of faulty advertisements, and/or graphically coded elements on the webpage.

Digital media content may include any information or characteristics of the digital media which may aid in a valuation of such content. Digital media information may, merely by way of example, include any digital pictures, audio, animations, videos, and/or multi-media of any format which may be interactive or passive, and may also include any meta data attached to those things.

Digital media characteristic may, merely by way of example, include the number, amount, proportion, ratio, changes in type, resolution/quality, size, file format, category, authors, date created, uniqueness, cost, copyrights, meta tags, meta data and attributes of any interactive or passive digital pictures, audio, animations, videos, and/or multi-media content. Other example of digital media characteristics for movies and animation may include: type; genre; size; category; file format; length; quality; cast; crew; producers; date created; date released; educational content; cost; third party ratings; copyrights; uniqueness; and/or licenses.

Internet forums, or forums for short, may include blogs, web forums, message boards, discussion boards, discussion forums, discussion groups, bulletin boards, and dial-up bulletin boards. Internet forums may allow a person to start a thread (a set of posts or electronic messages), and possibly reply to another thread. Internet forums may also be either public and therefore allow anyone to view, private which requires permission to access, or a combination of the two.

Internet forum features may include internal forum features and external forum features. Internal forum features may include those features which if the forum was taken off-line would be fixed at that moment. External forum features may include those features which involve interaction with the forum's environment and/or users. Both internal and external forum features may be measured and/or gathered, possibly over a discreet or continuous period of time.

Internal forum information may, merely by way of example, include the posts, threads, forum categories, and members. Internal forum characteristics may, merely by way of example, include the number, type, content and/or attributes of the: threads; posts; forum category and sub-categories; length of the posts; posts per member; posts per visitor; length of membership; and/or spam posting. Although a visitor may be a person, a visitor may also be a virtual thing, for example, a computer program, another web site, an automated program, and/or search engine spider which visits a particular virtual resource.

Possibly taking into account time, and using a mathematical methods, internal forum characteristics may, merely by way of example, include the averages, running averages, maximum, minimums, growth rates, growth trends, proportion, and ratio of: posts; threads; spammed posts; non-spammed posts; threads with replies; threads without replies; and/or threads with digital media content. Additionally, internal forum characteristics may, merely by way of example, include the type of forum, the forum's layout, the amount, type and quality of: code running the forum, add-ons like email notification, web feed syndication, and/or any other additional forum features or systems.

External forum information may, merely by way of example, include the visitors, registered and unregistered members, member base, registered and unregistered authors, and/or author base.

External forum characteristics may, merely by way of example, include the number, type, proportion, ratio, growth rate, average, maximums, minimums of: the visitors; registered members; unregistered member; member base; registered authors; unregistered authors; and/or author base. Forum characteristics may also, merely by way of example, include: the number of posts per member; frequency of member posting; monthly visits per member; online time of visitor and member; time when members signed up; rate of growth of the member base; rate at which back links are created; proportions of active to in-active members; registered to un-registers; members to non-members; and/or paying to non-paying members. Additional external and internal forum features may be available from third-party sources including, but not limited to, demographic information about the visitors, members, and authors of a forum.

Text content information may, merely by way of example, include: series of words; sentences; paragraphs; pages/web pages; online books; short paragraphs; blog entries; posts; threads; articles; reports; documents; and/or publications of any format. Text content may include text combined with other types of content to create hybrid content, for example, any media with a significant amount of text imbedded in it; flash animation with text paragraphs imbedded; a PDF report with imbedded pictures; and/or a chart with significant embedded description.

Text content has features which may be more important to some audiences than others. The list of text content characteristics that may be important to all audiences may, merely by way of example, include the text's: amount; form; format; style; category; genre; language; author; quality; sentence structure; sentence length; number and ratio of spelling and grammar mistakes; level of lingual sophistication; accuracy of information; reputation of writer; syndication and publisher; uniqueness; date written; original publisher; usefulness ratings; third party rating or ranks; text links; lead syndicates; and/or amount and proportion of imbedded media and multi-media. Some text content characteristics may, merely by way of example, be the relevance and importance to other news, current events, and news category.

Text content characteristics which may be important to webmasters may, merely by way of example, include: the original location; third party rankings; links with advertisements; embedded advertisements; relevance to other content; relevance to other domain name; relevance to other web site; relevance to other web site category; relevance to other industry; associated traffic; keyword saturation; ranking of keywords; amount of keywords; web traffic; search hits; visitors; and/or web feeds (type, amount, rankings, syndicating sites). Some text content characteristics may, merely by way of example, include the relevance and importance to another: other domain name; web site; publisher, web site category; and/or industry.

Text content characteristics which may be important to article and eBook sellers, merely by way of example, include: the acknowledgments; sources of acknowledgements; attributes of the reviewers; number of review and their ratings; comments about the text; comments incited by the text; in print; out of print; and/or price of similar or identical text content.

Other types of text content information and characteristic may, merely by way of example, be estimates of interest; appeal; attractiveness; and utility to any given audience.

Web traffic elements may include web traffic and web feeds. Web traffic may include information and/or characteristics which relate to the way in which the environment, Internet, users or other web sites, interact with the web site. Web feeds or syndication may include a method of making digital content available to a range of outlets simultaneously from a syndicate. Web syndications may be used, viewed and/or distributed for free or to those having a license.

Web traffic information may, merely by way of example, include the visitors, visitor base, subscribers, subscriber base, and/or web traffic. Web traffic information may also, merely by way of example, include the number, type, demographics, language, income, attributes of the visitors and/or subscribers; most requested entry and exit pages; top path (way visitors navigate the site); type, number, quality, attributes of the referrers and back links; search engine listings; reach, rank, page views, ranking on a search engine; and/or web traffic logs.

Web traffic characteristics may, merely by way of example, include the average, maximum, minimum, growth rates, trends and ratios of: search engine rankings; search engine listing; keyword saturation; incoming paid traffic; organic paid traffic; page views per visitor; visitor duration; page duration; a page busy time; and/or a website's busy time. Web traffic characteristic in some cases may be computed by a third party web traffic site or software program.

A web feed may be a document or stream of updated documents provided by the web syndicate which contain content, usually text content but may include digital media contents. Web feeds or syndication may include a method of making digital content available to a range of outlets simultaneously from a syndicate. The web feed may be a summary of the content being syndicated or the content itself (ex. a title of an article with a summary or the full article with title.)

Web feeds may provide for any number of purposes and function (ex. advertising for a web site, or informing member of an Internet forum of a new thread). Web syndication formats may, merely by way of example, include Really Simple Syndication ("RSS") and Atom. Web syndications may, merely by way of example, be transported over protocols such as HTTP, HTML, JavaScript, and XML. Web feeds may be subscribed to directly by users, by web syndication aggregators (which collect the content of multiple web feeds), and by automated software programs (ex. a program script on a web site which sometimes displays random web feeds as entertainment.)

Web feed information may, merely by way of example, include the web feed; syndicate; subscriber; text content; aggregator; third party ranking and ratings; comparable feeds cost and/or price; traffic details; web traffic details; television traffic; syndicate's name; syndicate's domain name; syndicate's web site; syndicate's authors; and/or demographics of the subscribers.

Web feed characteristics may, merely by way of example, include the number, quality, length, maximum, minimum, changes in average, ratio of: content; amount of text content; text content; digital media content; file format; protocol; times updated of web feed; advertisements; subscribers; subscribers region; subscriber demographics; web traffic; search hits; visitor; views per day; third party rankings, third party ratings; and/opr aggregators.

Web feed characteristics may also, merely by way of example, be the: syndicate's reputation; syndicate author's reputation; syndicates financial status; syndicates online time; syndicate's website's monetary value; and/or demographics of the subscribers, web feeds topic, web feeds category, and/or relevance to feed topic.

Marketing information may, merely by way of example, include information about a web site's: products; goods; services; properties; in-stock items; back ordered items; prices; costs; retail price; promotional/sale prices; placement; location; organization; promotions; promotional campaigns; sales; specials; deals; auctions; customers; sales transactions; endorsements; and/or customers.

Marketing characteristics may, merely by way of example, include the amount, type, quality, frequency, percentage, attractiveness ratings, change over time, additions, organization, re-arrangements, add-ons, change in price, change in volume, change in quantity, averages, proportions, maximum, minimums, ratios, third party ratings, third party rankings, placement, of a web site's: products; goods; properties; services; auctions; promotions; sales; specials; deals; in-stock items; back ordered items; transactions; endorsements; customers; and/or sales transactions.

Other marketing characteristics may, merely by way of example, include: sum value of inventory; sum value of a product line or service line; type of promotions being offered during a week; quality of goods being offered; frequency of promotional offers; percentage of inventory offered in deals/specials; percentage of inventory in a particular category; attractiveness rating of sales; percentage change in attributes of a particular inventory item over a year; number of additional services added over a month; number of rearrangements of particular goods in a product category; number of change in placement of products on a website over a week; number of new add-ons services for a product; change in price of a service offering; change in the volume of items in-stock; change in quantity of back ordered products; average number of transactions; proportion of guaranteed to not guaranteed products; proportion of items in-stock to out of stock; ratio of items back-ordered to order available; maximum number of auctions being offered during a day; ratio of items on auction vs. direct sales; average third party ratings of product in a product category; maximum third party ranking of services in a service category; amount of customers; number of places a sale is displayed; amount of categories a product is listed in for sale; change in the number of sales transactions over a week; total number of items offered in the inventory which were added in the last month.

Still other marketing characteristic may include a comparison of any of the previously defined or suggested marketing characteristics against one or more third party web sites and/or third party information. Marketing characteristics may, merely by way of example, also include any of the following in comparison to another web site: size of a product inventory; proportional amount of overlapping inventory; average price difference in an inventory category; percentage increase in marketing effort; difference in frequency in price change; amount of price change for a similar service; proportion of open auctions; difference in the number of items added to a product; percentage of inventory in a particular category; percentage of inventory not included in a competitors inventory; difference in frequency and starting time of specials; ratio of services changed over a week; ratio of customers purchasing a service; difference in the number of places a product is listed for sale; difference in rating of the level of marketing effort; and/or difference in rating of the level of promotional effort.

Third-party embedded elements may include any information and/or characteristics on a web site which is owned or licensed by a third-party. Third-party embedded elements information may, merely by example, include any of the following on the appraised web site: third-party advertisements ("ads"), third-party databases, third-party content, and/or third-party program or code.

Third-party embedded elements' characteristics related to advertisements may, merely by example, include the type, amount, quality, category and attributes of any advertisements on the web site; banner ads; pay per impression ads; popup ads; pay per click ads; and/or contextual ads. Other characteristics of advertisements may, merely by example, include the type (text, audio, picture, video, animation, multimedia); revenue derived from ads; third-party rankings of ads; reputation of advertisers; embedded content in the advertisements; associated ads web traffic (keyword saturation, web traffic, search hits, visitors); and/or web feed and web advertisements (type, amount, rankings, feed subscribers, email, third-party advertising networks, subscribers, and/or syndicating sites). Another characteristic of the advertisement may also be the ad's relevance to other content, domain names, web sites, web site categories, and/or industries.

A third-party embedded content element may include all of the information and characteristics of the prior defined content elements, but may be owned or licensed out by a third-party. An example of a third-party embedded program or code may, merely by way of example, be an embedded Java Script or AJAX script, or picture, for example, a map, calendar, or video (where the content or program in that element is owned or managed by a third-party).

Third-party sources may include any sources of information, data and characteristics which may come from someone or something other than the thing being appraised and the one conducting the appraising. Third-party sources may, merely by way of example, include: third-party: digitally networked information and data; web sites; domain names; internet forum; text content; web feed; webpage; programs; databases; companies; organizations; and groups. Third-party sources may also, merely by way of example, include similar or competing: web sites; domain names; internet forums; text content; content; web feeds; web pages, databases, companies, organizations, and groups. Third-party sources may also, merely by way of example, be obtained or collected by any of the described methods or process of the web crawling system and described methods of delivery or request. Third-party sources may be electronic and non-electronic sources such as physical publications of information and characteristics.

Machine observable information from a third-party source and may, merely by example, include: web traffic data; data, information and characteristics from other web sites; ranking and ratings from other third-parties; search engines results and data; third-party related web tools; online encyclopedia (dictionaries and thesauruses); syndication rating and rakings; finance web sites; web category (i.e. DMOZ.org, abbreviated category); information, reviews, and comments from other web sites.

Characteristics derived from third-party source information may, merely by way of example, include: type, quality, frequency, market share, percentage, ratings, rankings, change over time, organization, categorization, change in price, change in volume, change in quantity, averages, proportions, maximum, minimums, ratios, placement of the: keywords; ad words; advertisements; syndications; web categories; market capitalization; revenues; sales; acquisitions; bankruptcies; and all described machine observable information and characteristics of web sites as discussed above.

Characteristic derived from third-party source information may, merely by way of example, include: number of bidders for an auctioned keyword; monthly average auction value of a keyword; average monthly price rate increase for a keyword; average growth rate in the number of bidders for a keyword; number of web site highly related to a keyword; average number of web sites using a keyword; click through volume for a keyword; click through volume for a keyword category, market revenue for a keyword; average number of domain name registered over a year with a keyword in their name; number of synonyms for a keyword; average growth of synonyms for a keyword; degree of separation of a synonym from a keyword; average market share of visitors in a category over a week; increase in market share of visitors over a month; growth rate of visitor for a category over a year; rate of increase in downloads volume in a category; market share of content in an category; number of web pages view with for a particular keyword per week; maximum number of web feeds in a web category; average number of posting in a feed category; maximum web site ranking in a category; amount of distorting in ranking in a category; proportion of ranking web sites vs. un-rank: proportion of rated to amount of content in a web site; ratio of public to non-public web site in a category; combined market capitalization of web site in a category; average web site revenue in a category; maximum web site value in a category; combined number of subsidiaries in a category; average number of acquisition in a category over a year; average number of bankrupts in a category; proportion of expired websites and domains in category to active; average number of new website and domain in a category; and/or combined trading volume of a category.

The classification of a web site may be obtained from information on an online directory such as DMOZ.org, or may be provided by the website itself. If no information about the classification of the website can easily be found, the classification may possibly be determined by analyzing the information and/or characteristic of website and any of its elements. The classification of a website may, merely by way of example, include: archive sites (i.e. archive.org); blog sites (also referred to as weblogs); business sites (for promoting a business or services); commerce sites (or called eCommerce sites, used for purchasing, selling or trading goods and services both real and virtual (i.e. overstock.com or forrester.com); content sites where user pay to access content; auction sites (i.e. ebay.com); social networking sites (i.e. MySpace- .com); database sites (i.e. IMBD.com); development sites (support development of any thing, process, or organization, example software development sites); directory sites (example DMOZ.com); download site; employment site (example monster.com); game site (example MSN games); humor sites; information sites; encyclopedia sites; software sites (sites that run web accessible software "also known as web applications"); mirror sites (host copies of other existing web sites); news sites; political sites; pornography sites; rating sites (example hotornot.com); search engines (example yahoo.com); shock sites (example, contains shocking or offensive material); critique sites (critics a thing, person or place); vanity sites (otherwise known as a "personal sites"); web portal sites (example MSN.com); Wiki sites (collaboratively created and edited sites like wikipedia.com); and/or hybrid sites (any combination of the above listed or non-listed categories of web sites).

Business information and characteristics may, merely by way of example, include the number, average, maximum, minimum, proportion, ratio, attributes, changes over time, and quality of the business's: revenues; costs; debts; expenses; financial items; market cap; stock price; number of stock outstanding; employees; employees cost; developers; partners; development cost of the web site; maintenance needs and costs; method of accepting payments; customers; feature; customer demographics; and/or any other data which would relate to business aspects of the web site or business.

Miscellaneous elements may include additional elements or features not already described. Some possible miscellaneous elements may include the member base, blog features, Awards, illegal things, dysfunctional elements, business features, and/or general attributes of a web site or portion of a web site.

Member information may, merely by way of example, include any information about the member and the member base. Member characteristics may, merely by way of example, include any number, quality, demographics, region, financial status of, and changes in, and status of the members and/or member base.

Examples of blog features may include blog information and blog characteristics. Blog information may, merely by way of example, also include the blog, authors, the blog's text content, and/or blog's software. Blog characteristics may, merely by way of example, include the frequency, number, ratio, length, maximum, minimum, average, category topics, and changes in: posts to the blog; comments to posts; subscribed feed readers; and/or subscribed email readers.

Awards may be earned by web sites, and awards may be listed on the awarding web site as well as displayed on the receiving web site. An award's information may be the award itself. An award's characteristics may, merely by way of example, include the type, number, quality, reputation, rating and attributes of any awards obtained by a: web site; website author; text content author; digital media content; syndicate; and/or aggregator.

In some embodiments, illegal elements may not be valued or will subtract value from a web site, or some portion of the web site. Examples of illegal elements may, merely by way of example, include: infringing things that are copyrighted, trademarked, and/or patented, offers for sale or distributed; obscene material; terrorist material; and any other things which could be considered illegal, or possibly bordering on illegal.

Examples of the sub-category dysfunctional elements may, merely by way of example, be misleading and mislabeled elements; misleading links; mislabeled objects; non-functional or semi-functional web pages; dysfunctional code or programs; false or incorrectly displaying items; and/or incorrectly displaying web pages.

Examples of the general attributes may include but are not limited to: date of the web site's establishment (i.e. the date the web site went public); number of affiliate web sites; similar web sites; and/or confusingly similar web sites.

In another embodiment, a method for automatically determining an appraisal value of a web site is provided. The method may include obtaining machine observable information from a web site and determining a machine observable characteristic of the web site based at least in part on the machine observable information from the web site. The method may also include storing at least one of the machine observable information from the web site, and the machine observable characteristic of the web site. The method may further include determining the appraisal value of the web site based at least in part on at least one of the machine observable information from the web site, and the machine observable characteristic of the web site. In some embodiments, the method may also include obtaining machine observable information from a third-party source and determining the appraisal value of the web site based also at least in part on the machine observable information from the third-party source.

In some embodiments, the method may further include providing a document. The document may contain at least one or more of the appraisal value of the web site, the machine observable information from the web site, and the machine observable characteristic of the web site. In these or other embodiments, the method may further include determining a price for at least one good, service, or advertisement available on the website, based at least in part on the appraisal value of the web site.

In another embodiment, a machine-readable medium having machine-executable instructions for automatically determining an appraisal value of a web site is provided. The machine-readable medium may include machine-executable instructions for obtaining machine observable information from a web site. The machine-readable medium may also include machine-executable instructions for determining a machine observable characteristic of the web site based at least in part on the machine observable information from the web site. The machine-readable medium may further include storing at least one of the machine observable information from the web site, and the machine observable characteristic of the web site.

The machine-readable medium may also include determining the appraisal value of the web site based at least in part on at least one of the machine observable information from the web site, and the machine observable characteristic of the web site. In some embodiments, the machine-readable medium may further include machine executable instructions for obtaining machine observable information from a third-party source and determining the appraisal value of the web site based also at least in part on the machine observable information from the third-party source.

In some embodiments, the machine-readable medium may further include machine executable instructions for providing a document. The document may contain at least one or more of the appraisal value of the web site, the machine observable information from the web site, and the machine observable characteristic of the web site. In these or other embodiments, the machine-readable medium may further include instructions for determining a price for at least one good, service, or advertisement available on the website, based at least in part on the appraisal value of the web site.

In another embodiment, a method for automatically determining an appraisal value of a portion of a web site is provided. The method may include obtaining machine observable information from a portion of a web site, where the portion of the web site is selected from a group consisting of a domain name, an Internet forum, text content, and a web feed. The method may also include determining a machine observable characteristic of the portion of the web site based at least in part on the machine observable information from the portion of the web site. The method may further include storing at least one of the machine observable information from the portion of the web site, and the machine observable characteristic of the portion of the web site.

The method may also include determining the appraisal value of the portion of the web site based at least in part on at least one of the machine observable information from the portion of the web site, and the machine observable characteristic of the portion of the web site. In some embodiments, the method may further include obtaining machine observable information from a remainder of the web site and determining the appraisal value of the portion of the web site based also at least in part on the machine observable information from the remainder of the web site. In some embodiments, the method may further include obtaining machine observable information from a third-party source and determining the appraisal value of the portion of the web site based also at least in part on the machine observable information from the third-party source.

In some embodiments, the method may further include providing a document. The document may contain at least one or more of the appraisal value of the portion of the web site, the machine observable information from the portion of the web site, and the machine observable characteristic of the portion of the web site. In these or other embodiments, the method may further include determining a price for at least one good, service, or advertisement available on the website, based at least in part on the appraisal value of the portion of the web site.

In another embodiment, a method for automatically determining an appraisal value of a domain name is provided. The method may include determining a machine observable characteristic of a domain name, and storing at least one of the domain name, and the machine observable characteristic of the domain name. The method may also include determining the appraisal value of the domain name based at least in part on the machine observable characteristic of the domain name.

In some embodiments, the method may further include obtaining machine observable information from a third-party source and determining the appraisal value of the domain name based also at least in part on the machine observable information from the third-party source. In these or other embodiments, the method may further include providing a document. The document may contain at least one or more of the appraisal value of the domain name and the machine observable characteristic of the domain name.

FIG. 1 shows a system 100 capable of performing at least some portion of the methods of the invention. The system 100 illustrated in FIG. 1 may operate on one or more of any type of host digital device, for example, a computer, server or mainframe, and may have some portion of its components located, operating, or running in a remote location. Components and sub-systems of system 100 may be connected to each other by any means of conveying data, digitally or electronically, in or between any digital or electronic devices. Merely by way of example, components and sub-systems of system 100 may be connected via the Internet, an intranet, serial or parallel communications, and/or wireless networks.

The process of valuing a thing with this system may possibly be initiated directly or indirectly by at least one user, or automatically by the system itself. The user 110 may request data from the system by any of the described methods of delivery or request. The data requested by the user may be an appraisal value, information from, and/or a characteristic of a web site; a portion of a website such as an Internet forum, a domain name, text content and/or web feed; and/or a domain name independent of a web site.

In some embodiments, users 110 may, merely by way of example, include those persons, organizations, and/or software programs which directly or indirectly access or request data. Software programs which may access or request data may include affiliate or partner web sites; search engines, (for example yahoo.com, or google.com; third-party web sites; program scripts; and/or any other means involving an manual or automated process.

The methods and/or systems by which a user, or other component of system 100 may request and consequently receive data may include digitally networked devices, for example, computers, servers, landline phones, mobile phones, personal digital assistants, beepers, voice over IP ("VoIP") devices, and/or fax; analog devices, for example, landline phones, beepers, and/or radios; physical means, for example, conventional mail, physical delivery, and/or distribution of memory media (for example CD, DVD, flash drive, and/or magnetic disk). In some embodiments, requesting and delivery of data over digitally networked devices may be accomplished with a host web site, a partner's or affiliate's web site, email, web feed, client software, landline phone, mobile phone, VoIP, and/or instant messaging.

A graphical user interface system ("GUI system") 120 interacts with users 110, and may communicate with a valuation system 130 and central database system 140. GUI system 120 may allow user 110 to request, generate, view, compare, and/or save any historical data, current data, and/or predicted data. Historical data may relate to any data which may not be the most recent and/or reasonably up-to-date. Current data may relate to the most recent or present data available. Predicted data may relate to any data that is expected but has not yet occurred. Along with the data, user 110 may also request any, features, elements, graphics, text and/or characteristics associated with the data. In some embodiments, user 110 may instruct system 100 via GUI system 120 to perform the request immediately, at another time, or according to a schedule.

GUI system 120 may also display to user 110 the "wait time" until the request is completed, and the number of other requests for data queued before theirs. The "wait time" and number of requests queued may be determined and updated by valuation system 130. In some embodiments, users 110 may also pay a provider of system 100, or other party, to reduce their request's wait time and/or position in the data queue. GUI system 120 may also allow a user to pay a provider of system 100, or other party, for making the request for data and/or providing the data in response to a request, where the charge is based at least in part on the functions performed and/or data requested.

In some embodiments, GUI system 120 may display data using any digitally networked devices, analog device (ex. such as a phone), or physical delivery means as discussed above. In some embodiments, merely by way of example, data may be transmitted or displayed over a web site, syndicated web feed, syndicated protocol, short message service, instant messenger, web browser plug-in, Transmission Control Protocol ("TCP"), Internet Protocol ("IP"), Simple Object Access Protocol ("SOAP"), wireless device, software program or by print. Transmission or presentation may also occur in audio form, for example, as an audio clip, over a telephone communication, VoIP, and/or any other audio transmission technology.

A web crawling system 150 may interact with any connected resource or resources, for example, the Internet and the World Wide Web (in this example, website A 160, web site B 165 and/or 3rd party resource 170), while also possibly communicating with the central database system 140 as shown in FIG. 1. The process or task of crawling a web site, text content, an Internet forum, a domain name, a web feed, a web page, a third-party source, and other resources, possibly on the Internet, may be initiated by valuation system 130 at time. These processes or tasks may be performed at any frequency, including continuously during real time. Web crawling system 150 may also be referred to as a web spider or web robot, and may be any program which browses the World Wide Web or other network (for example, as information on systems primarily accessed by mobile device) in a methodical and/or automated manner.

In some embodiments, web crawling system 150 may create a copy of a portion or an entirety of a browsed web site for processing by another method, program, or piece of software. In these or other embodiments, web crawling system 150 may be a software program which browses an accessible digital network and things residing on those networks. In some embodiments, web crawling system 150 may create a copy of and/or measure the attributes of information gathered from browsed resources, and possibly verify the validity of the information and attributes gathered and measured. Activity of web crawling system 150 may generally be referred to as "crawling."

In some embodiments, crawling may be initiated by web crawling system 150 automatically, possibly when the gathered information is considered by web crawling system 150 not to be current. Users 110 may also initiate crawling, possibly by instructing GUI system 120 to transmit a request or instruction to web crawling system 150.

Crawling may include any number of possible methods, for example: by restricting followed link crawling which may primarily examine and request HyperText Markup Language ("HTML") Uniform Resource Locators ("URLs"); by path-ascending crawling which may ascend multiple paths in each URL to be crawled; focused crawling which may attempt to download web pages and other virtual elements that are similar to each other.

The things which may be crawled may include any thing accessible with or without permission on a network and may include, merely by way of example, any type of information discussed above. In some embodiments, web crawling system 150 may store and use passwords or other security methods given by users 110 or other party to access restricted information on the network.

All information or data gathered, collected or copied by web crawling system 150 may be stored in central database system 140 and may be accessed at any time by web crawling system 150. In some embodiments, web crawling system 150 may also record and store any data pertaining to its process and task in central database system 140. Merely by way of example, some types of data may be a number of times crawling has been done, a date of crawling, and data from crawling of third parties, for example cost paid for data, crawling time, and un-accessible items.

Central database system 140 may communicate with and store information and data for GUI system 120, web crawling system 150, valuation system 130, or other component or sub-component of system 100. Merely by way of example, this may include information gathered by web crawling system 150, characteristics determined by valuation system 130, or instructions submitted by users 110, possibly via GUI system 120.

In some embodiments, GUI system 120 may initiate any of the processes conducted by valuation system 130. In these or other embodiments, valuation system 130, or more particularly, some sub-component thereof, may also automatically initiate any of these or other processes. In various embodiments, tasks may be initiated based on any defined conditions, presets, schedules, and/or thresholds.

Figure 2:
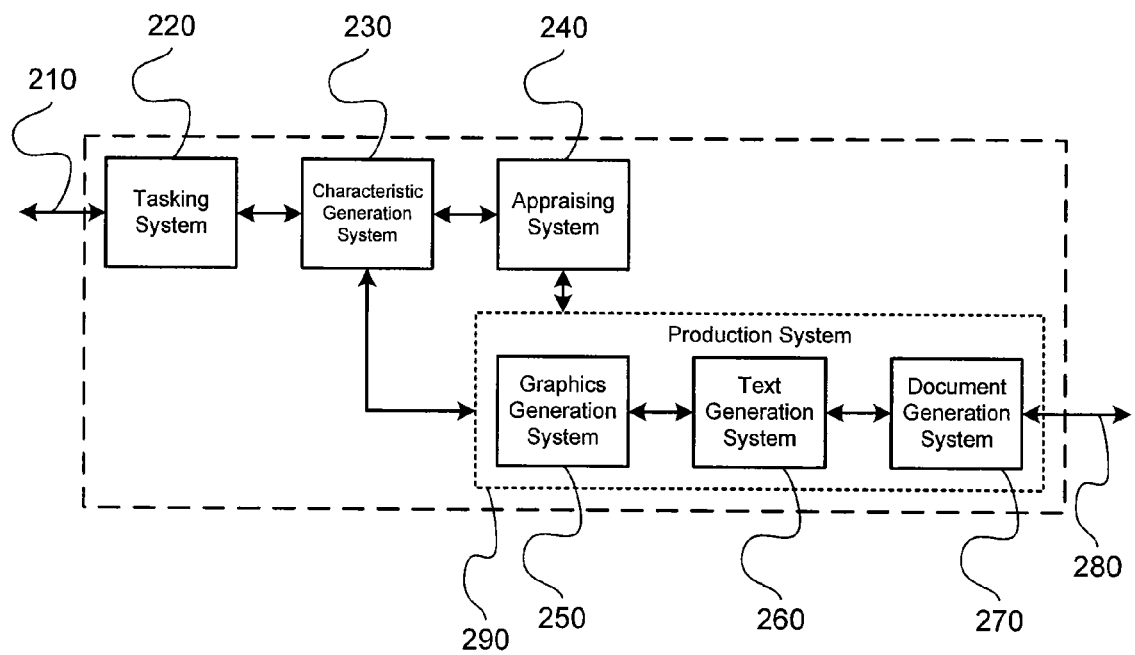
FIG. 2 is a block diagram of the valuation system from FIG. 1 which includes tasking system, a characteristic generation system, an appraising system, and a production system.

FIG. 2 shows one possible embodiment of valuation system 130. In this embodiment, valuation system 130 may include a tasking system 220, a characteristic generation system 230, an appraising system 240, and a production system 290 which may include a graphic generation system 250, a text generation system 260, and a document generation system 270. In this embodiment, a first connection 210 from tasking system 220 may be in communication with GUI system 120. A second connection 280 from document generation system may be in communication with GUI system 120. Tasking system 220 may receives a request from user 110 input at GUI system 120, and compile a series of tasks to be performed by other sub-systems of valuation system 130. Other tasks may also be compiled independent of user 110 requests, and initiated automatically as discussed above.

Tasking system 220 may also perform queuing tasks for valuation system 130. Merely by way of example, tasking system 220 may create queues, organize queues, and/or executing queues to be performed by any one or more of the systems and sub-systems of the invention. Tasking system 220 may also monitor tasks to be performed and being performed, status of, and other details of all the sub-systems of valuation system 130, along with any other systems shown in FIG. 1 and/or FIG. 2. The status and details of any systems and/or sub-systems monitored by tasking system 220 may be transmitted to GUI system 120 to be displayed. In some embodiments, the status and details of any of systems and/or sub-systems may be stored in central database system 140. Merely by way of example, queue details may include the number of requests in the queue, completion status of a document, and estimated time to crawl a web site.

Another possible function of tasking system 220 may be to connect with central database system 140 and identify, gather, verify, edit, modify, delete, and re-store any data required for a task created by tasking system 220. Merely by way of example, when a weekly document is requested by user 110, tasking system 220 may first check for a current version of the document in central database system 140. Tasking system 220 may locate the current version and modify it by sending it to document generation system 270 to modify at least some portion of the document, possibly a data stamp, before transmitting the document to GUI system 120.

A characteristic generation system 230 may receive tasks and/or data from tasking system 220. Characteristic generation system 230 may thereafter determine characteristics and transmit tasks, data and/or generated characteristics to appraising system 240 and/or to the production system 290.

Characteristic generation system 230 takes any information and/or other data stored in central database system 140 and use them to determine characteristics. Characteristics may be the result of applying any algebraic, statistical, calculus, and/or other numerical methods to any one piece or combination of information and/or data to create a numerical result. In at least some cases, characteristics may be the same as or referred to as metrics. The specific types of information and characteristics which may be determined from web sites or portions of web sites are numerous, and some possible examples have been discussed above. Merely by way of example, general types of characteristics which may be determined include, but are not limited to, historical, current and/or predicted: proportions, totals, ratios, market size, market share, rates of change, change over time, percentage change, average, minimum, maximums, and/or running averages. Characteristic generation system 230 may also calculate the errors and/or statistical deviations associated with any particular characteristic. All characteristics and corresponding data such as associated errors may be stored in central database system 140, communicated to appraising system 240, and/or production system 290.

Appraising system 240 may use any or all of the information, characteristics, and/or data, previously described to determine an a historical, current, and/or predicted appraisal value of a web site, portion of a web site, and/or domain name. In some embodiments, appraising system 240 may also calculate the possible error associated with an appraisal value. Appraising system 240 may also determine a characteristic associated with an appraisal value, for example, an appraisal value per member, an appraisal value per web site visitor, and/or an appraisal value per search engine hit, and/or visit.

Web sites, Internet forums, text content, domain names, web feeds, and/or other virtual components may be composed of several elements and/or features which may be valued as a whole and/or as at least some combination of those components which comprise it, as a sum of the values of its components, elements and/or features, by how those elements and/or features interact with each other, and/or by how those elements, features, and/or the whole, interact with the environment and/or users.

Appraising system 240 may use any general or specific method of valuation. Some possible examples of general valuation methods include, but are not limited to: comparison pricing to similar item, sale of similar item, catalog or established price listings, market pricing (supply and demand), perceived utility pricing, cost based pricing, asset return valuation, gut level pricing, and/or comparable auction pricing. Methods of pricing may, merely by way of example, include fixed, cost-based, cost-plus, markup, demand-based, value-based, rate of return, competition-based, differential, negotiation, secondary market, auction, and/or real time pricing.

Merely by way of example, one possible valuation algorithm that may be used by appraising system 240 to value a web site ($A.V._{site1}$) may be:

$$A.V._{site1} = \left[ \left[ \sum_1^n ((f(R_1, R_{1\max})) + (f(R_1, R_{2\max}))...(f(Rn, R_{n\max}))) \right] * \right.$$
$$\left( f(v) = \frac{Rank_1}{Rank_{1\max}} \approx \frac{Rank_2}{Rank_{21\max}} \approx \frac{Rank_3}{Rank_{3\max}} \right) +$$
$$\left[ \sum_1^n W_{page\,n} \right] + \left[ \sum_1^n (W_{feed\,n} = F_{feed\,n} * W_{f.n}) \right] +$$
$$(f(\text{Page Load Time})) + (f(\text{Response Time})) +$$
$$\left[ \sum \left( f(Ln) = \frac{Wp \cdot N \cdot Wl * Wr}{W_{A.V.link} \cdot n} \right) \right] +$$
$$\text{Market}.V(\text{Domain}) +$$
$$\left. [f(T.O., \text{Average}(T.O._1) * f(M.S.(\text{category}) * M.V.(\text{category}))] \right]$$

(Market Rate)

An explanation below of this exemplary algorithm will use example information and characteristics from a fictitious website called weddingcameras.net, appraised and valued on Aug. 20, 2006.

The first summation in this example shows the contribution of any or all the third party rankings of the web site, of which each ranking captures a function which outputs a corresponding value for that ranking. $Rank_1$ may denote the first third party ranking and $Rank_{1\max}$ may denote the maximum rank that can be achieved. $Rank_1$ may be the maximum entrance page Google Page Rank (G.P.R.), and in this example the G.P.R. may be 4 and $Rank_{1\max}$ may be 10. Additionally, $Rank_2$ will be illustrated as the Alexa Rank of 235,438 and $Rank_{2\max}$ will be 1. Rank3 will be illustrated as Rank value 3 out of $Rank_{3\,max}$ of 5. The value of the first summation may then be 490.

The function f(v) may correlate all previous rankings as a security check for rankings that may be manipulated. In this case, all the rankings show a high correlation as being valid and receive an f(v) value of 0.95, making the combination of the first summation and the correlation check equal to 465.50.

The second summation may capture the appraised value of the individual pages on a website, and in this illustration the sum of the appraised value of the pages may be 1380. The function for appraising the individual web pages may also take into account the third party ranking, content and back links for each web page, in addition to other items like operational code and how often the page is viewed.

The third summation denotes the appraised value of the web feeds on that web site, and in this illustration the sum of the appraised web feeds may be 140, valued based on 700 subscribers for two web feeds each syndicating content in similar categories. The value of each web feed may be determined by multiplied $F_{feed\,n}$ or the number of subscribers by the weighting factor for web feeds denoted as $W_{f.n}$, which may take into account the category, value of a subscriber, and number of syndication per month, and/or value of that content.

The functions of page load time and server response time in this example does not obtain a particularly high value for being quick, rather, it is penalized by a negative value in the event that the site loads or responds slowly or not at all. In this example the Page Response Time is 235 milliseconds, and Page Load Time is 45 seconds, which awards a small premium of 20 to function of the response time, and a negative value of 250 to page load time.

The summation of the value of the links is next illustrated. The function of links may be denoted by Ln, and is the formula consisting of appraised value of the page to which that link is connected denoted Wp, the amount of time the link has been shown denoted N, the weight assigned to each link denoted Wl, the degrees of category separation from the web site's category denoted Wr all divided by the linking web site's appraised value denoted $W_{A.V.\,link}$ and the number of links on that web page denoted n. In this illustration weddingcameras.net has one incoming link where Wp is 200, N is 24, Wl may be a variable constant, Wr may be a variable constant depending upon the category, $W_{A.V.\,link}$ is 1,000 and n is 8. For this summation the value of the incoming link may be 6.00.

The domain value may be determined in this illustration by comparing the domain name to market prices for the domain name. In this illustration the undeveloped domain name "Weddingcameras.com" just sold alone for $1,000. The appraised web site's domain name weddingcameras.net is then determined to be valued at 500 based in part on the average market value difference between the two domain name extensions (".net" versus ".com").

Finally, the last bracket in this illustration may determine the value contributed by the internet market share which that web site has captured and the establishment date of that web site. This may be done to insure well developed stable web sites are properly valued when compared to fad or relatively new web sites, which may have captured market share but are in an unsustainable position. The first function may take into account the online time denoted T.O. of the web site, also known as the establishment period, the average online time for that industry. In this illustration the website's online time may be 36 months and industry has an average of 30 months which may result in the function value being 0.45.

The second function in the last bracket may take into account the market share of the web site, in terms of visitors, page views, keyword saturation, hits, search requests per key word all in that particular web category, in this illustration the market share may be determined to be 0.002. The third function in the last bracket may determine the market value and stability of capital in that web category, and in this case may be determined via a third party source to be 5,000,000 with an 45% stability as of Jan. 1, 2006. The resulting value for the last bracket in this illustration may be found to be 4,500.

Finally, the sum of all the values of the algorithm are converted into a currency in this illustration, U.S. Dollars for example, and valued at an exchange rate on Aug. 20, 2006, to be 1.004 possibly determined based on the creation date for this illustrated algorithm, inflation rate, and interest rate in the U.S. The final resulting value for the fictitious website weddingcameras.net may be determined by this illustrated algorithm to be $6,788.55, which taken in a secondary calculation, f (error), which estimates error in the measuring, characterizations, and/or calculations to be 4.7% and outputs an appraised web site value to the user at the high end to be $7,108, and at the low end to be $6,469. Many other algorithms are possible within the scope of the present invention, some of which may take into account more or fewer pieces of data, information, characteristics, constants, and/or numerical operations.

Appraising system 240 may also store additional data useful or necessary for determining an appraisal value besides information gathered by web crawling system 150 and characteristics determined by characteristic generation system 230. This data may possibly be stored in an internal database, or in central database system 140. Some examples of this additional data may include current market prices and demand for all types, groups, categories of: domain names, web sites, Internet forums, text content, web feeds; web pages; and/or dynamic constants required by the valuation algorithm. These dynamic constants may change over time and may be determined based at least in part on information gathered by web crawling system 150 and characteristics determined by characteristic generation system 230.

Appraising system 240 may also request, possibly via tasking system 220, that web crawling system 150 gather any additional information and/or that characteristic generation system 230 determine additional characteristics. The additional information and/or characteristics may be used to perform a valuation and possibly stored in a database, such as central database system 140.

Appraising system 240 may provide appraisal values in any currency using current and past exchange rates stored in its internal database, extracted from a third-party, inputted manually, and/or gathered by web crawling system 150. Appraising system 240 may also communicate all used and un-used information, characteristics, and/or other data to a production system 290.

Production system 290 may include graphics generation system 250, text generation system 260, and document generation system 270. Graphics generation system 250, text generation system 260, and document generation system 270 may be arranged in any manner and execute tasks in any order including in series or in parallel. Production system 290 may output anything produced along with the information, characteristics, and/or other data received by production system 290.

Graphics generation system 250 may receive information, characteristics, and/or other data from appraising system 240 and/or other systems and creates graphics based at least in part on the information, characteristics, and/or other data. The graphics may be included in a document to be created by document generation system 270. Graphics generation system 250 may, merely by way of example, create copy, generate and/or format any number or combination of axis graphs, bubble charts, pie charts, bar charts, stock charts, and/or any other graphic by which data may be illustrated visually.

Figure 3:
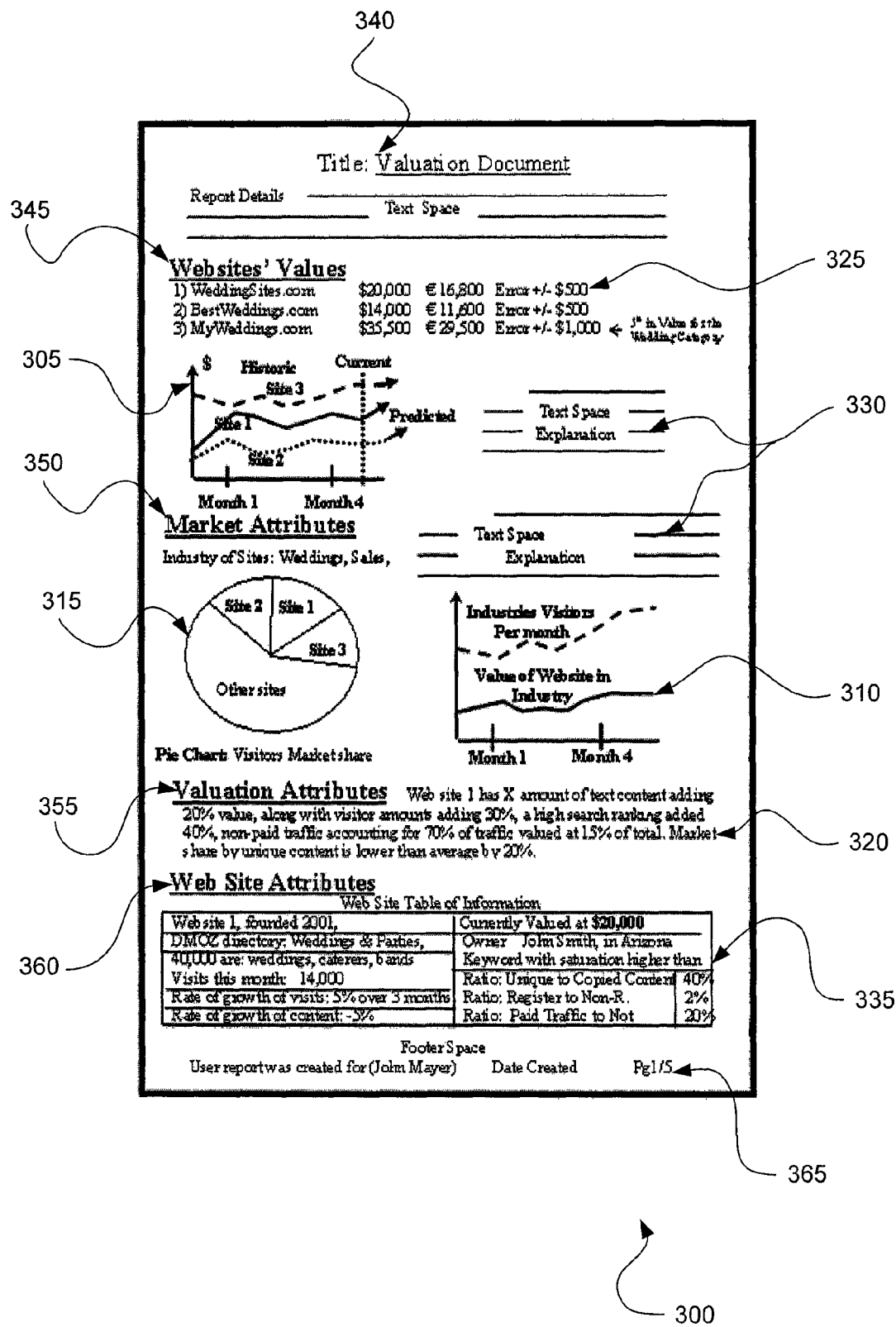
FIG. 3 is an example of one possible valuation document produced by one embodiment of the invention.

Turning to FIG. 3, an example document 300 produced by document generation system 270 is shown. Examples of graphics produced by graphics generation system 250 are line graphs 305, 310 and pie graph 315. Graphics may be colored, animated, have embedded watermarks, and/or labeling text. Graphics may be of any graphic or animation file format, for example, bitmap ("bmp"), graphic interchange format ("gif"), joint photographic experts group ("jpg"), tagged image file format ("tiff"), moving picture experts group ("mpg"), audio video interweave ("avi"), and/or windows media video ("wmv"). All graphics may be communicated along with data to text generation system 260, document generation system 270, and/or any other system described. Graphics generation system 250 may also store and re-access any generated graphics directly in central database system 140 or other database.

Text generation system 260 may, merely by way of example, generate text phrases, sentences, and paragraphs. Text generation system 260 may, merely by way of example, describing, detailing, and explaining the: interaction of; attributes of; and actions of any: systems, information, characteristic, valuation, graphic, and/or other data. Text comments may be generated which are relevant to any particular information, characteristic, and/or other data. Common text phrases, which may include prewritten descriptions and responses, along with their format, may be stored in an internal database within text generation system 260, or possibly in central database system 140.

An example of text that may be generated by text generation system is a valuation attributes discussion 320. In valuation attributes discussion 320, a text explanation is combined with information and/or characteristics into an explanatory paragraph detailing the valuation of a web site. Other examples shown in FIG. 3 of text generated by text generation system 260 may include numbers concerning the valuation 325, miscellaneous explanations 330, and text for tables 335. Text generation system 260 may generate text in multiple languages and/or any font styles.

Document generation system 270 combines, organizes, creates and edits data created by graphics generation system 250 and text generation system 260 to create a document 300. Document 300 may pertain to any number of web sites, domain names, Internet forum, text content, web feeds and/or other components and their respective industries. Document 300 may possibly be viewed by the users 110 through GUI system 120 and/or may be stored in central database system 140. Document 300 may be generated in any digital file format, for example, hypertext markup language, extensible markup language, PHP: Hypertext Preprocessor language, active server page language, asynchronous javascript, a word processing document, portable document format, e-mail, simple message script, executable file, web feed, image form, jpg, bmp, and/or tiff. Document 300 may be accessed and/or viewed by user 110 through any means described for above in reference to GUI system 120.

User 110 may request a specific format for document 300, or create a custom format for the document. Document generation system 270 may also create text, or instruct text generation system 260 to create text, in the form of heading, labels, and designations as illustrated in this example by document title heading 340, website value heading 345, market attributes heading 350, valuation attributes heading 355, and web site attributes heading 360. Footer information 365 may also be created. An internal database in document generation system 270, or central database system 140, may store any titles, formats, and fonts needed to create the document.

In some embodiments, users 110 may be persons or entities which may access data stored in the central database system 140, or receive documents from the system 100, to perform additional functions. Some entities may be other web sites, search engines, organizations, and/or automated programs. These persons or entities may access and use the appraised values, information, and characteristics derived from systems and methods described herein to perform the following: organize, rank, list, and/or filter: search results; products; services; goods; advertisement; and/or auctions of anything virtual or real. Further, the appraised values, information, and characteristics may be used by an automated program to determine the price to charge for a good, service, or advertisement, possibly available on a web site.

In some embodiments, a method of the invention may determine and/or derive the price to charge for a good, service, or advertisement based at least in part on the valuation of a web site or portion of a web site. These methods may communicate with any of the described systems and retrieve the appraised value of a web site or portion of a web site. In some embodiments, a method may retrieve the underlying information and characteristics used to compute those appraisal values. Using the appraisal values and possibly other data, the method may determine a price for a good, service, or advertisement associated with a web site or portion of a web site. The method may apply an algorithm which implements a pricing methodology to determine the price from the data.

General types of algorithms which may be used to determine these prices include, but are not limited to, comparison pricing of similar goods, services, or advertisements; closing sale prices of similar goods, services, or advertisements; catalog or established price listings; market pricing; perceived utility pricing; cost based pricing; gut level pricing; comparable auction pricing; cost-based pricing; cost-plus pricing; markup pricing; demand-based pricing; value-based pricing; rate of return pricing.

Figure 4:
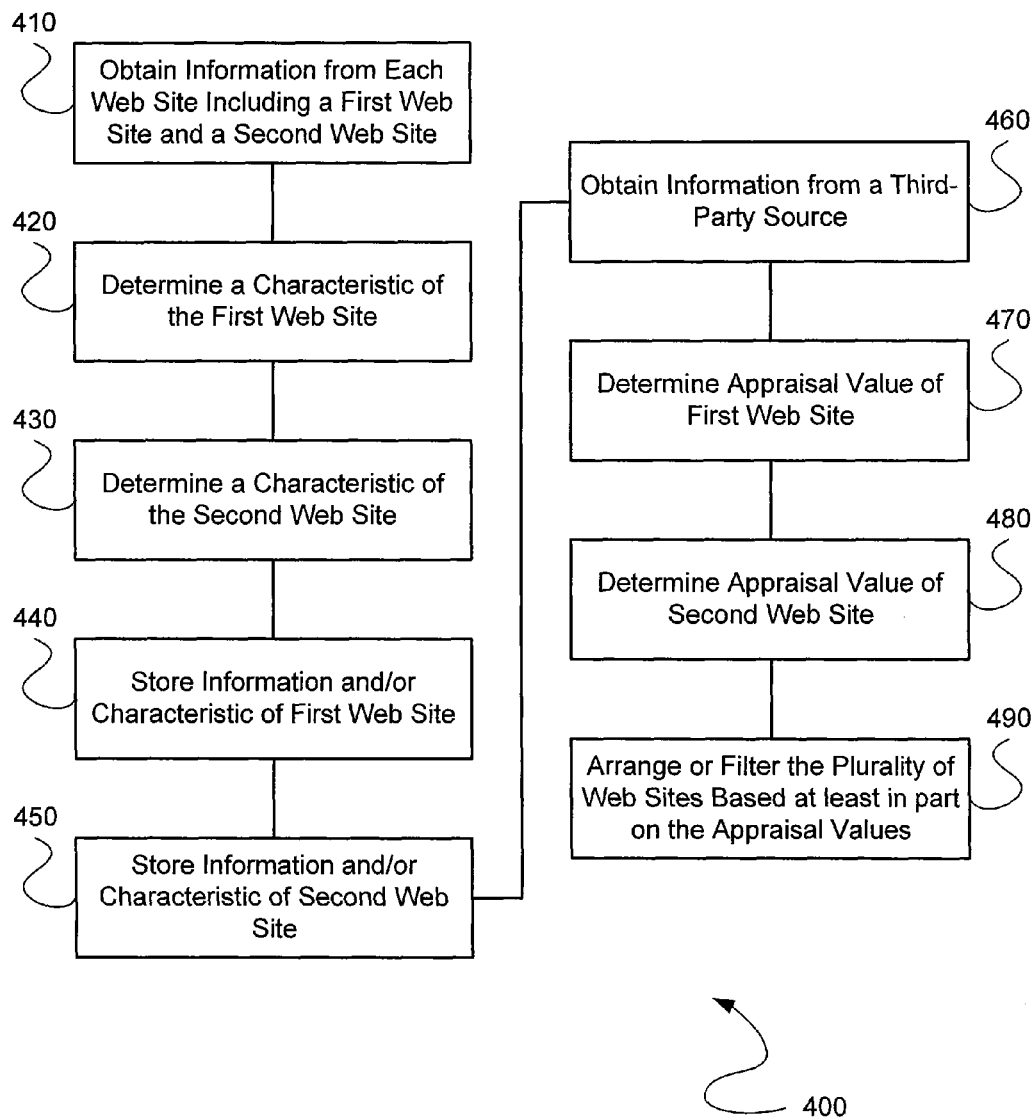
FIG. 4 is a block diagram of a method of the invention for arranging or filtering a plurality of web sites based at least in part on the appraisal value of each web site.

FIG. 4 shows a block diagram of a method 400 of the invention for arranging or filtering a plurality of web sites based at least in part on the appraisal value of each web site. At block 410, the method may obtain information from each of a plurality of web sites, which include a first web site and a second web site. At block 420, the method may determine a characteristic of the first web site based at least in part on the information obtained from the first web site. At block 430, the method may determine a characteristic of the second web site based at least in part on the information obtained from the second web site.

At block 440, the method may store information and/or characteristics of the first web site. At block 450, the method may store information and/or characteristics of the second web site. At block 460, the method may obtain information from a third-party source. At block 470, the method may determine an appraisal value of the first web site based at least in part on at least one of the information from the first web site, the characteristic of the first web site, and the information obtained from the third-party source. At block 480, the method may determine an appraisal value of the second web site based at least in part on at least one of the information from the second web site, the characteristic of the second web site, and the information obtained from the third-party source. At block 490, the method may arrange or filter the plurality of web sites based at least in part on the appraisal values of each web site.

Figure 5:
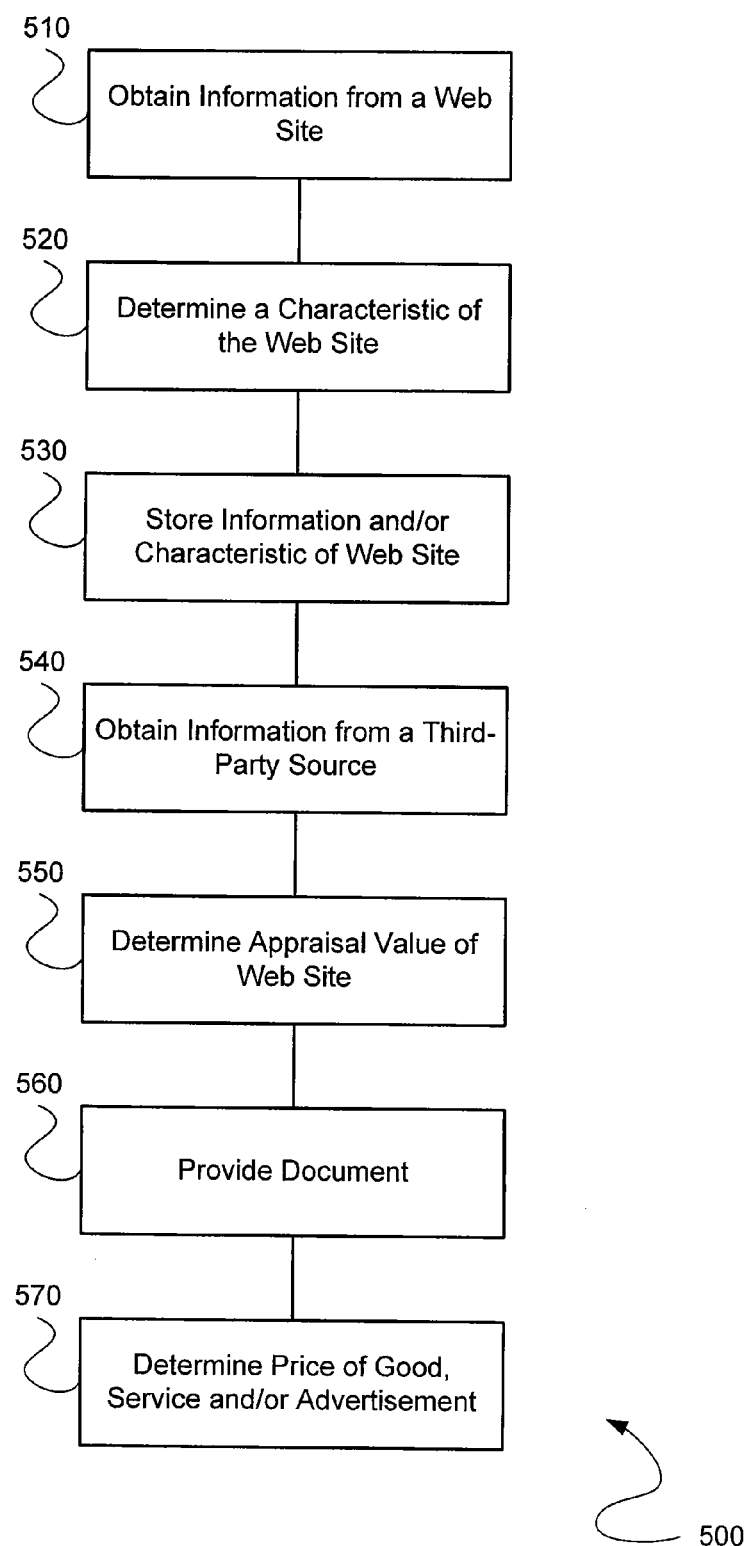
FIG. 5 is a block diagram of a method of the invention for automatically determining an appraisal value of a web site.

FIG. 5 shows a block diagram of a method 500 of the invention for automatically determining an appraisal value of a web site. At block 510, the method may obtain information from a web site. At block 520, the method may determine a characteristic of the web site based at least in part on the information obtained from the web site. At block 530, the method may store information and/or characteristics of the web site. At block 540, the method may obtain information from a third-party source.

At block 550, the method may determine an appraisal value of the web site based at least in part on at least one of the information from the web site, the characteristic of the web site, and the information obtained from the third-party source. At block 560, the method may provide a document which may contain at least one of the appraisal value of the web site, the information from the web site, and the characteristic of the web site. At block 570, the method may determine a price of a good, service, and/or advertisement available on the web site based at least in part on the appraisal value of the web site.

Figure 6:
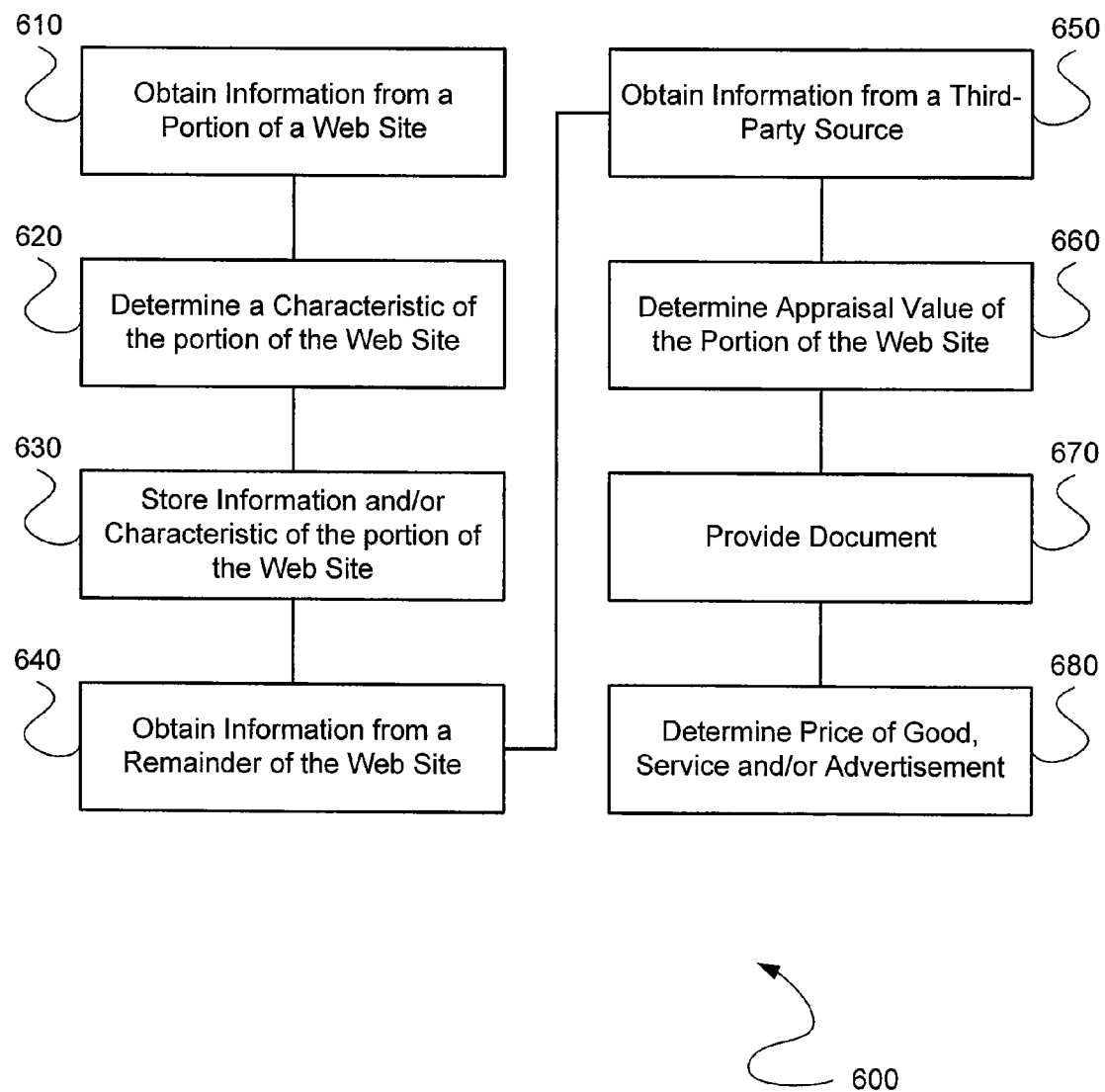
FIG. 6 is a block diagram of a method of the invention for automatically determining an appraisal value of a portion of a web site.

FIG. 6 shows a block diagram of a method 600 of the invention for automatically determining an appraisal value of a portion of a web site. At block 610, the method may obtain information from a portion of a web site. At block 620, the method may determine a characteristic of the portion of the web site based at least in part on the information obtained from the web site. At block 630, the method may store information and/or characteristics of the portion of the web site. At block 640, the method may obtain information from a remainder of the web site. At block 650, the method may obtain information from a third-party source.

At block 660, the method may determine an appraisal value of at least some portion of the web site based at least in part on at least one of the information from the portion of the web site, the characteristic of the portion of the web site, the information obtained from the remainder of the web site, and the information obtained from the third-party source. At block 670, the method may provide a document which may contain at least one of the appraisal value of the portion of the web site, the information from the portion of the web site, and the characteristic of the portion of the web site. At block 680, the method may determine a price of a good, service, and/or advertisement available on the web site based at least in part on the appraisal value of the portion of the web site.

Figure 7:
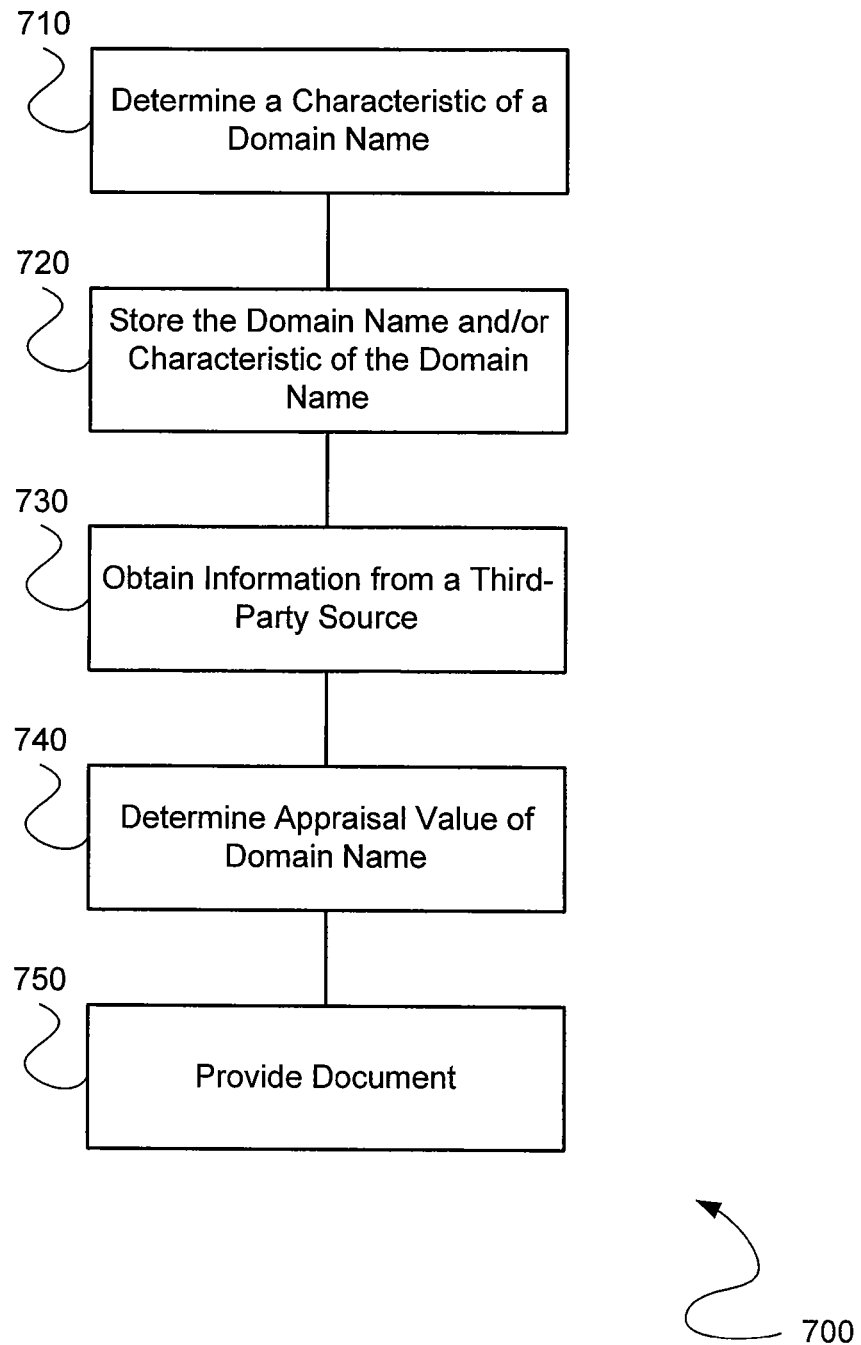
FIG. 7 is a block diagram of a method of the invention for automatically determining an appraisal value of a domain name.

FIG. 7 shows a block diagram of a method 700 of the invention for automatically determining an appraisal value of a domain name. At block 710, the method may determine a characteristic of the domain name. At block 720, the method may store the domain name and/or the characteristic of the domain name. At block 730, the method may obtain information from a third-party source. At block 740, the method may determine an appraisal value of the domain name based at least in part on at least one of the characteristic of the domain name and the information obtained from the third-party source. At block 750, the method may provide a document which may contain the appraisal value of the domain name or the characteristic of the domain name.

Figure 8:
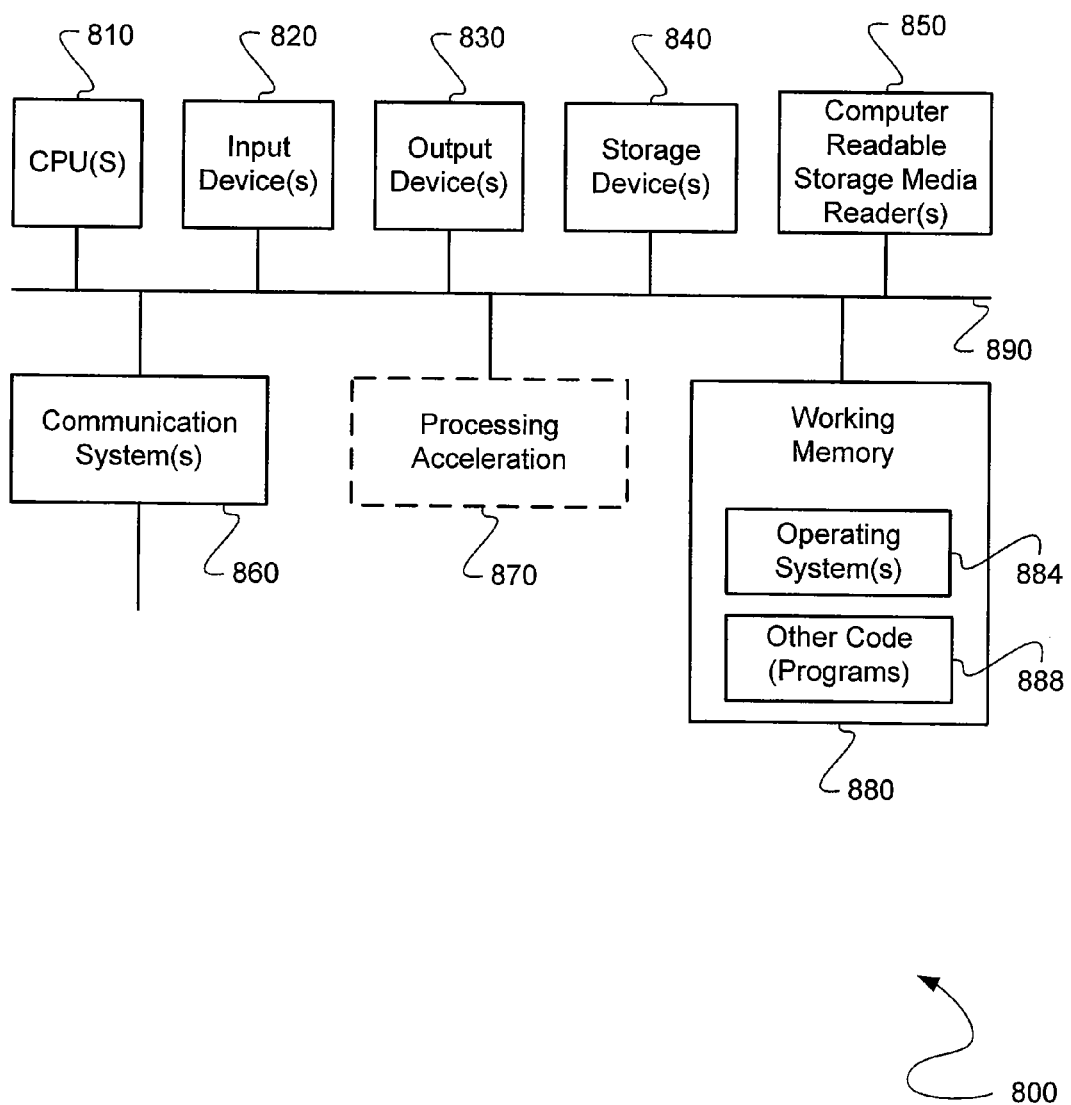
FIG. 8 is a block diagram of an exemplary computer system capable of being used in at least some portion of the apparatuses or systems of the present invention, or implementing at least some portion of the methods of the present invention.

FIG. 8 is a block diagram illustrating an exemplary computer system 800 in which at least some portion of embodiments of the present invention may be implemented. This example illustrates a computer system 800 such as may be used, in whole, in part, or with various modifications, to provide the functions of GUI system 120, valuation system 130, central database system 140, web crawling system 150, tasking system 220, characteristic generation system 230, appraising system 240, graphics generation system 250, text generation system 260, document generation system 270, and/or other components of the invention such as those discussed above. For example, various functions of web crawling system 150 may be controlled by the computer system 800, including, merely by way of example, accessing resources, copying information, and/or measuring attributes of information.

The computer system 800 is shown comprising hardware elements that may be electrically coupled via a bus 890. The hardware elements may include one or more central processing units 810, one or more input devices 820 (e.g., a mouse, a keyboard, etc.), and one or more output devices 830 (e.g., a display device, a printer, etc.). The computer system 800 may also include one or more storage device 840. By way of example, storage device(s) 840 may be disk drives, optical storage devices, solid-state storage device such as a random access memory ("RAM") and/or a read-only memory ("ROM"), which may be programmable, flash-updateable and/or the like.

The computer system 800 may additionally include a computer-readable storage media reader 850, a communications system 860 (e.g., a modem, a network card (wireless or wired), an infra-red communication device, Bluetooth device, cellular communication device, etc.), and working memory 880, which may include RAM and ROM devices as described above. In some embodiments, the computer system 800 may also include a processing acceleration unit 870, which may include a digital signal processor, a special-purpose processor and/or the like.

The computer-readable storage media reader 850 may further be connected to a computer-readable storage medium, together (and, optionally, in combination with storage device(s) 840) comprehensively representing remote, local, fixed, and/or removable storage devices plus storage media for temporarily and/or more permanently containing computer-readable information. The communications system 860 may permit data to be exchanged with a network, system, computer and/or other component described above.

The computer system 800 may also comprise software elements, shown as being currently located within a working memory 880, including an operating system 884 and/or other code 888. It should be appreciated that alternate embodiments of a computer system 800 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 800 may include code 888 for implementing any or all of the function of the various elements of the architecture as described herein. For example, software, stored on and/or executed by a computer system such as system 800, may provide the functions of the GUI system 120, valuation system 130, central database system 140, web crawling system 150, tasking system 220, characteristic generation system 230, appraising system 240, graphics generation system 250, text generation system 260, document generation system 270, and/or other components of the invention such as those discussed above. Methods implementable by software on some of these components have been discussed above in more detail.

A number of variations and modifications of the invention may also be used within the scope of the invention. For example, valuation of other virtual properties may be accomplished using the methods and systems described herein. Such virtual properties may include, merely by way of example, data, server processing time, download streams, upload streams, bit torrents, streaming audio feeds, streaming video feeds, streaming multi-media feeds, pod cast feeds and files, internet communication bandwidth, augmented environment data, and even virtual possessions and characters in online multiplayer virtual entertainment worlds such as EverQuest, World of Warcraft, and Sims Online.

The invention has now been described in detail for the purposes of clarity and understanding. However, it will be appreciated that certain changes and modifications may be practiced within the scope of the appended claims.

What is claimed is:

1. A method for automatically determining an appraisal value of a first web site, the method comprising:
receiving, by a computer-implemented characteristic generation system, a task from a computer-implemented tasking system, the task comprising a directive to generate a web site appraisal of the first web site;
obtaining automatically upon receiving the task, by the computer-implemented characteristic generation system, machine observable information elements about the first web site and machine observable information about a second web site, wherein the machine observable information elements include at least one of a content element and a web traffic element for both the first and second web sites, wherein the second web site includes at least one web page with at least one link to the first web site;
calculating, by a computer-implemented appraising system, an appraisal value for at least the first web site based at least in part on a ratio of an appraisal of the at least one web page of the second web site to an appraisal of the second web site linked; and
outputting the appraisal value.

2. The method for automatically determining an appraisal value of the first web site of claim 1, further comprising:
obtaining machine observable information elements from the first web site, wherein the machine observable information elements additionally include one or more elements selected from a group consisting of:
an operational element;
a domain name characteristic;
a web feed element;
a marketing element;
a third-party embedded element;
a type of web site; and
a business element;
wherein the appraisal value comprises a monetary value calculated further as a function of the machine observable information elements for the web site.

3. The method for automatically determining an appraisal value of the first web site of claim 2, wherein the operational element is selected from a group consisting of:
programming code;
a hosting detail;
a server detail;
a software client; and
a web application.

4. The method for automatically determining an appraisal value of the first web site of claim 2, wherein the content element is selected from a group consisting of:
text content;
digital media content;
an Internet forum; and
a web feed.

5. The method for automatically determining an appraisal value of the first web site of claim 2, wherein the third-party embedded element is one of machine observable information from a third party or machine observable characteristics from the third party.

6. The method for automatically determining an appraisal value of the first web site of claim 1, further comprising:
obtaining a machine observable characteristic of the first web site, wherein the machine observable characteristic of the first web site is one of domain name information or domain name characteristics;
wherein the appraisal value comprises a monetary value calculated further as a function of the machine observable characteristic of the first web site.

7. The method for automatically determining an appraisal value of the first web site of claim 6, wherein the machine observable characteristic of the first web site is one of internet forum information or internet forum characteristics.

8. The method for automatically determining an appraisal value of the first web site of claim 6, wherein the machine observable characteristic of the first web site is selected from a group consisting of:
a quantity of text content;
uniqueness of text content;
a language text content is composed in;
an author of text content; and
a quality level of lingual sophistication of text content.

9. The method for automatically determining an appraisal value of the first web site of claim 6, wherein the machine observable characteristic of the first web site is one of digital media information or digital media characteristics.

10. The method for automatically determining an appraisal value of the first web site of claim 1, further comprising:
determining, by the computer-implemented appraising system, a machine observable characteristic from at least one element of the machine observable information elements about the first and second web sites, wherein the machine observable characteristic of the first web site is selected from a group consisting of:
a number of subscribers to a web feed;
a time length between updates of a web feed;
a demographic of a subscriber; and
value of the web feed's text content.

11. The method for automatically determining an appraisal value of the first web site of claim 1, the method further comprising:
obtaining machine observable information from a third-party source,
wherein the appraisal value comprises a monetary value calculated further as a function of the machine observable information from the third-party source.

12. The method for automatically determining an appraisal value of the first web site of claim 11, wherein the machine observable information from the third-party source is selected from a group consisting of:
back links;
web traffic information;
web ratings and rankings;
syndication ratings and rankings;
category information; and
search engine information.

13. The method for automatically determining an appraisal value of a web site of claim 1, wherein outputting the appraisal value comprises:
outputting the appraisal value to a computer-implemented production system configured to generate an output product as a function of the appraisal value, the output product comprising at least one of textual or graphical data relating to the web site appraisal.

14. The method for automatically determining an appraisal value of a web site of claim 1, wherein the machine observable characteristic is related to at least one of geographical characteristics, socioeconomic characteristics, or demographic characteristics related to the first web site.

15. A method for automatically determining an appraisal value of a web site being linked-to by web pages of other web sites, the method comprising:
obtaining, by a computer-implemented web site valuation system, machine observable information elements from the web site, the machine observable information elements comprising at least:
one machine observable information element being a hyperlink between the web site and a web location other than the web site,
a content element, and
a web traffic element;
determining a machine observable characteristic of the web site based at least in part on the machine observable information elements about the web site, the machine observable characteristic determined from at least one of the machine observable information elements;
for each of the web pages of the other web sites having at least one link to the web site, calculating a ratio of an appraisal for a respective web page of a respective other web site to an appraisal of the respective other web site;
storing each appraisal in a data store communicatively coupled with the computer-implemented web site valuation system; and
determining the appraisal value of the web site based at least in part on at least one of the calculated ratios.

16. The method for automatically determining an appraisal value of a web site of claim 15, the method further comprising providing a document, wherein the document contains a selection from a group consisting of:
the appraisal value of the web site;
the machine observable information from the web site; and
the machine observable characteristic of the web site.

17. The method for automatically determining an appraisal value of a web site of claim 15, the method further comprising:
obtaining machine observable information from a third-party source; and
determining the appraisal value of the web site based also at least in part on the machine observable information from the third-party source.

18. The method for automatically determining an appraisal value of a web site of claim 15, wherein the predefined appraisal function is configured to account for an historic valuation of the web site calculated as a function of present and historical records of transacted web site values.

19. The method for automatically determining an appraisal value of a web site of claim 15, wherein the predefined appraisal function is configured to account for a revenue valuation of the web site calculated as a function of either expected revenue or proven revenue from the web site.

20. The method for automatically determining an appraisal value of a web site of claim 15, wherein the predefined appraisal function is configured to account for a valuation of the web site calculated as a function of elements selected from a group consisting of:
   a cost of creating at least a portion of the web site;
   an appraised value of at least one of individual elements of the web site and a relationship among the individual elements of the web site; and
   an appraised value of at least one of third-party elements relating to the web site and a relationship among the third-party elements relating to the web site.

21. A machine-readable storage device having machine-executable instructions for automatically determining an appraisal value of a web site, the machine-executable instructions, when executed, causing a processor to perform a method, comprising:
   obtaining machine observable information elements from a web site, the machine observable information elements comprising:
      one machine observable information element being a hyperlink between the web site and a web location other than the web site,
      a content element, and
      a web traffic element;
   determining a machine observable characteristic of the web site based at least in part on the machine observable information from the web site, the machine observable characteristic determined from at least one machine observable information element;
   for each web page of at least one other web site, the web page of the at least one other web site having a link to the web site, calculating a ratio of an appraisal of the web page of the at least one other web site to an appraisal of the other web site;
   storing at least one of:
      the machine observable information from the web site; or
      the machine observable characteristic of the web site; and
   determining the appraisal value of the web site based at least in part on at least one of the calculated ratios and at least one of:
      the stored machine observable information from the web site, or
      the stored machine observable characteristic of the web site.

22. The machine-readable storage device having machine-executable instructions for automatically determining an appraisal value of a web site of claim 21, the machine executable instructions, when executed, causing a processor to perform a method, further comprising providing a document, wherein the document contains a selection from a group consisting of:
   the appraisal value of the web site;
   the machine observable information from the web site; and
   the machine observable characteristic of the web site.

23. The machine-readable storage device having machine-executable instructions for automatically determining an appraisal value of a web site of claim 21, the machine executable instructions, when executed, causing a processor to perform a method, further comprising:
   obtaining machine observable information from a third-party source; and
   determining the appraisal value of the web site based also at least in part on the machine observable information from the third-party source.

24. The machine-readable storage device having machine-executable instructions for automatically determining an appraisal value of a web site of claim 21, wherein at least one good, service or advertisement is available on the web site, and the machine executable instructions, when executed, causing a processor to perform a method, further comprising determining a price of at least one good, service, or advertisement available on the website based at least in part on the appraisal value of the web site.

\* \* \* \* \*